US009310022B2

(12) United States Patent
Sakaguchi et al.

(10) Patent No.: US 9,310,022 B2
(45) Date of Patent: Apr. 12, 2016

(54) PORTABLE TANKING SYSTEM AND METHOD

(71) Applicant: Pacific Gas and Electric Company, San Francisco, CA (US)

(72) Inventors: Michael Tom Sakaguchi, Turlock, CA (US); Jon Wilson Armstrong, Yorba Linda, CA (US); Leonard Todd Caldwell, San Ramon, CA (US); Richard D. White, Daville, CA (US)

(73) Assignee: Pacific Gas and Electric Company, San Francisco, CA (US)

( * ) Notice: Subject to any disclaimer, the term of this patent is extended or adjusted under 35 U.S.C. 154(b) by 218 days.

(21) Appl. No.: 14/206,749

(22) Filed: Mar. 12, 2014

(65) Prior Publication Data

US 2014/0261707 A1 Sep. 18, 2014

Related U.S. Application Data

(60) Provisional application No. 61/784,456, filed on Mar. 14, 2013.

(51) Int. Cl.
*F16L 35/00* (2006.01)
*F17C 1/00* (2006.01)

(52) U.S. Cl.
CPC ............. *F17C 1/00* (2013.01); *Y10T 137/0318* (2015.04); *Y10T 137/86276* (2015.04)

(58) Field of Classification Search
CPC .. F17C 1/00; F17C 13/085; F17C 2205/0161; B62B 1/264; B62B 2202/022
USPC ......................... 137/357, 376, 377, 382, 581; 280/47.19, 47.24, 47.26, 79.6
See application file for complete search history.

(56) References Cited

U.S. PATENT DOCUMENTS 4,625,949 A * 12/1986 Walker .................... B62B 1/264 266/48
5,071,148 A * 12/1991 Salvucci, Sr. ........... B62B 1/264 137/382
5,261,559 A * 11/1993 Salvucci, Sr. ......... F17C 13/085 137/382
5,489,183 A * 2/1996 Malden ................... B62B 1/264 280/47.28
5,873,500 A * 2/1999 Homburg ............... F01M 11/04 222/399
6,733,017 B2 * 5/2004 Intravatola .............. B62B 1/264 280/47.26
2004/0245680 A1 * 12/2004 Wakeman ................ B23K 7/00 266/48

* cited by examiner

*Primary Examiner* — John K Fristoe, Jr.
*Assistant Examiner* — Reinaldo Sanchez-Medina
(74) *Attorney, Agent, or Firm* — Greenberg Traurig, LLP

(57) ABSTRACT

Some embodiments include a method of providing substantially uninterrupted gas service by coupling at least one gas cylinder to a portable tanking assembly. The tanking assembly can include a cart including a rear frame and a coupled carrier frame supported on an axle with wheels. In some embodiments, the carrier frame can include a caged regulation assembly housing at least a portion of a regulation apparatus with an upstream supply end coupled to a downstream delivery end. In some embodiments, the regulation apparatus includes a primary regulator coupled a one relief valve. The relief valve can be coupled to a downstream regulator, coupled to a water column gauge. In some embodiments, the regulation apparatus further includes a delivery valve. In some embodiments, the delivery valve comprises a distribution manifold assembly including a manifold and a plurality of distribution couplers coupled to the manifold.

26 Claims, 14 Drawing Sheets

Sketch No. 1 – Acceptable Service Line Configurations

PORTABLE TANKING SYSTEM AND METHOD

CROSS REFERENCE TO RELATED APPLICATIONS

This application claims the benefit of filing date of U.S. Provisional Application Ser. No. 61/784,456 titled "PORTABLE TANKING SYSTEM AND METHOD" filed on Mar. 14, 2013, the specification of which is incorporated by reference herein in its entirety.

BACKGROUND

A natural gas distribution system can include a natural gas service line that branches off of a main line in order to serve one or more residential or commercial customers. When a service line is replaced or undergoes maintenance, a natural gas utility company traditionally interrupts the flow of gas to the customer for an extended period (for many hours in most cases). The current total cost to connect an interrupted natural gas supply is in the hundreds of dollars per customer (including relighting the pilots and other various associated tasks) for the typical natural gas utility. An uninterrupted supply of natural gas during a service line replacement or maintenance operation would eliminate some of the reconnection tasks, thereby potentially reducing the total service cost. Furthermore, an uninterrupted supply of natural gas would provide additional value to the utility by improving the customer's perception and overall satisfaction with the utility as a service provider.

SUMMARY

Some embodiments comprise a method of providing substantially uninterrupted gas service during a temporary, primary gas service shutdown, comprising coupling at least one gas cylinder to a portable tanking assembly. The method can include a tanking assembly comprising a cart including a rear frame and a carrier frame coupled to and extending from the rear frame and supported on an axle with wheels, and a caged regulation assembly coupled to the cart. The caged regulation assembly can comprise a protective cage housing at least a portion of a regulation apparatus comprising an upstream supply end coupled to a downstream delivery end, and including a primary regulator coupled to at least one relief valve. The at least one relief valve can be coupled to at least one downstream regulator coupled to a water column gauge that can be coupled to at least one delivery valve. The method can include electrically coupling and grounding the tanking assembly to a customer's gas service line, fluidly coupling at least one downstream valve to a gas service line, coupling a high pressure hose to the gas cylinder, and controlling a downstream flow of gas from the gas cylinder to the gas service line using the regulation apparatus. Further, the method can include monitoring at least one of supply and flow of gas to ensure substantially uninterrupted gas service during the temporary shutdown of the primary gas service.

In some embodiments, the method can comprise a downstream flow of gas that is controlled and monitored using at least one of the high pressure hose coupled to the primary regulator, the relief valve, the downstream regulator, and the water column gauge. In some further embodiments, the regulator can include regulator gauges, and the downstream regulator can include a regulator vent. In some other embodiments, a first valve can be coupled between the relief valve and the downstream regulator.

In some embodiments, the at least one downstream valve can comprise the at least one delivery valve fluidly coupled to the gas service line. In some further embodiments, the at least one delivery valve comprises a distribution manifold assembly including a manifold and at least one distribution coupler coupled to the manifold. In some embodiments, the distribution manifold assembly comprises a plurality of couplers coupled to a plurality of gas service lines.

In some embodiments of the method, the rear frame can comprise a first vertical support and a second vertical support, and the carrier frame can comprise a first side and a second side. Further, the rear frame can be positioned substantially centered on the axle so that the first vertical support and the second vertical support are substantially equidistant from the axial center of the axle, and the carrier frame can be positioned on the axle substantially off-center so that the first side is positioned substantially further from the axial center of the axle than the second side.

Some embodiments of the invention include a portable gas delivery system comprising a cart including a rear frame comprising a first vertical support and a second vertical support and a carrier frame extending from the rear frame and supported on an axle with wheels. In some embodiments, the carrier frame is coupled to and extends from the rear frame and can comprise a first side comprising a plurality of first braces, and a second side comprising a plurality of second braces. Some embodiments include a caged regulation assembly coupled to the cart. The caged regulation assembly can comprise a protective cage housing at least a portion of a regulation apparatus comprising an upstream supply end coupled to a downstream delivery end. In some embodiments, the protective cage comprises at least one hinged door coupled to a main cage, and can comprise a mesh portion to allow air to flow through the protective cage.

In some embodiments, the regulation apparatus includes a primary regulator coupled to at least one relief valve. In some embodiments, the at least one relief valve is coupled to the at least one downstream regulator, which is coupled to a water column gauge.

In some embodiments, the rear frame is positioned substantially centered on the axle so that the first vertical support and the second vertical support are substantially equidistant from the axial center of the axle. The first side can comprise the first braces coupled to and extending substantially perpendicular from the first vertical support to couple with a first front support, and the second side can comprise the second braces coupled to and extending substantially perpendicular from the rear frame to couple with a second front support.

Some embodiments include a portable gas delivery system with a carrier frame that is positioned on the axle substantially off-center so that the first side is positioned substantially further from the axial center of the axle than the second side. In some embodiments, the caged regulation assembly is coupled to the second side. In some further embodiments, a majority of the caged regulation assembly is positioned over the axle.

In some embodiments, the cart further includes a flat base, and the first front support and the second front support are coupled to the flat base on substantially opposite sides. In some further embodiments, the first side further comprises a first thigh section coupled to the first front support and a second thigh section coupled to the second front support, and the first thigh section extends and couples with a first calf section, and the second thigh section extends and couples with a second calf section. The first calf section and the second calf section can be positioned are opposite corners of the flat base each extending substantially vertically from the flat base.

Some embodiments include at least one relief valve coupled to a primary regulator on the downstream delivery end side of the primary regulator. Further, the at least one relief valve can be coupled to the at least one downstream regulator on the upstream supply end side of the at least at least one downstream regulator. In some embodiments, the water column gauge is coupled to the downstream regulator on the downstream delivery end side of the downstream regulator.

In some embodiments, the regulation apparatus further comprises a downstream delivery end that includes at least one delivery valve coupled adjacent to the downstream delivery end side of the water column gauge. In some embodiments, the delivery valve comprises a distribution manifold assembly including a manifold and a plurality of distribution couplers coupled to the manifold, and the plurality of distribution couplers configured and arranged to delivery natural gas to a plurality of customers.

Some embodiments include a gas delivery system including a cart that comprises at least one deployable stabilizer foot. The stabilizer foot can be deployed to a deployed position or retracted to a retracted position. In some further embodiments, the cart further includes a toggle clamp coupled to a toggle mechanism. The toggle mechanism can be configured and arranged to be actuate the toggle clamp to hold and secure the caged regulation assembly. Some embodiments include a toggle mechanism that is configured and arranged to actuate the toggle clamp to release the caged regulation assembly from the second side of the carrier frame.

In some embodiments, the regulation apparatus further includes a high pressure hose coupled to the upstream supply side of the primary regulator. Some embodiments include the caged regulation assembly with a coupled grounding strap coupled to a grounding rod.

DETAILED DESCRIPTION

Figure 1A:
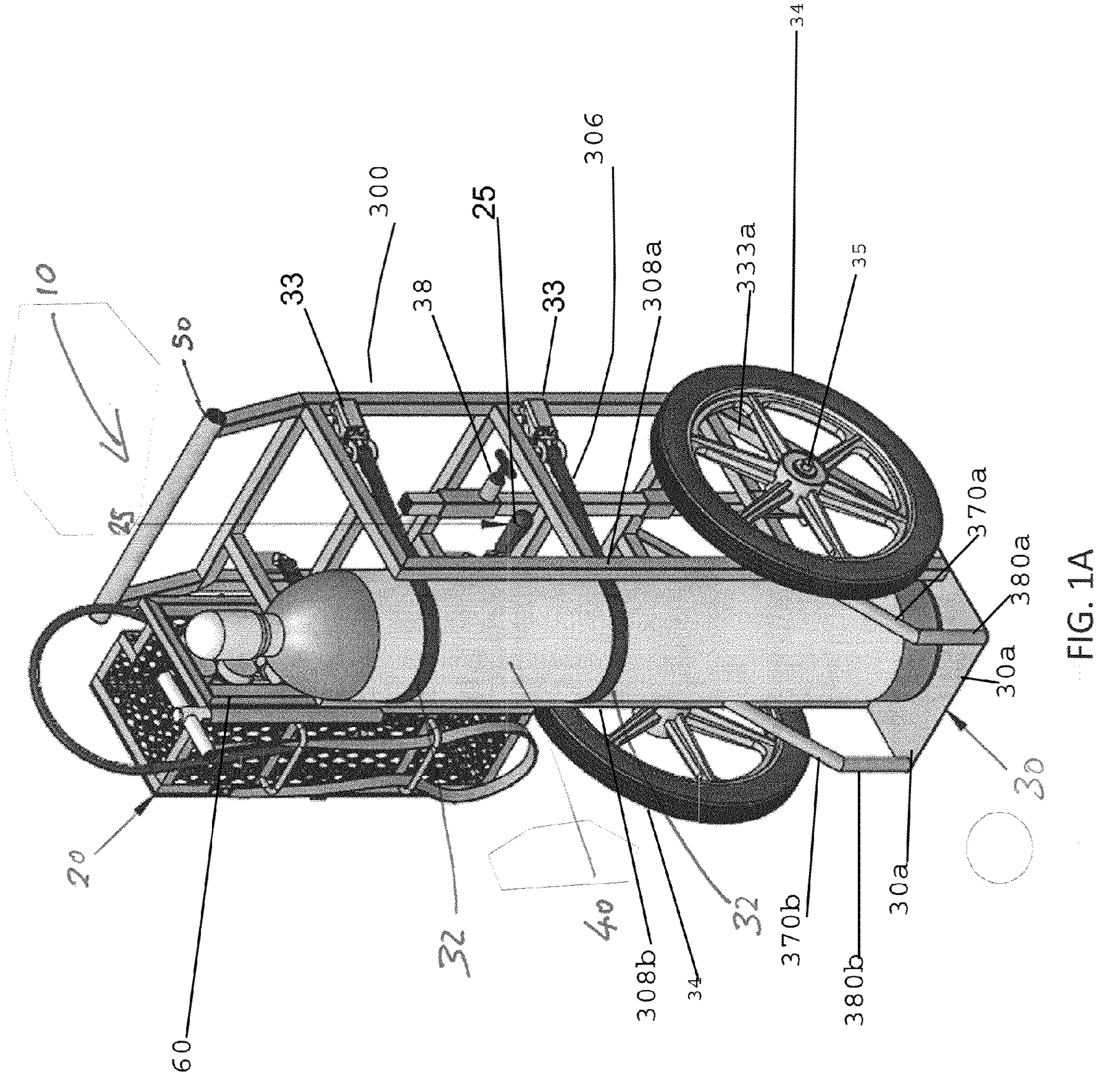
FIG. 1A is a perspective view of a portable tanking system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some embodiments of the invention include a portable tanking system 10 capable of providing a substantially uninterrupted service to natural gas customers 15 when a natural gas service line 17 undergoes replacement, or maintenance. In this instance, the portable tanking system 10 can provide a substantially uninterrupted service to residential or commercial natural gas customers 15 located in a building or structure, such as a residence, a factory, an office building, a store or mall, a hospital, or a school. In some embodiments, the natural gas customer 15 can include a building or structure that is substantially fixed and non-mobile. In other embodiments, the building or structure can be substantially mobile, for example, a mobile home or office, or a recreational vehicle. Some embodiments of the invention provide a portable tanking system 10 capable of providing a substantially uninterrupted service to more than one natural gas customer 15 at substantially the same time. For example, in some embodiments, a portable tanking system 10 can be capable of providing a substantially uninterrupted service to two natural gas customers 15 at substantially the same time.

In some embodiments of the invention, a substantially uninterrupted service can include a briefly disrupted flow of natural gas that does not result in the need for pilot light re-ignition. In some further embodiments of the invention, a substantially uninterrupted service can include a change in the pressure and/or flow of natural gas that does not result in the need for pilot light re-ignition. In all other embodiments, the portable tanking system 10 can be capable of providing a substantially uninterrupted service to natural gas customers 15, eliminating the need for pilot light re-ignition during and after coupling of the assembly 10 with a natural gas service line 17.

Figure 6:
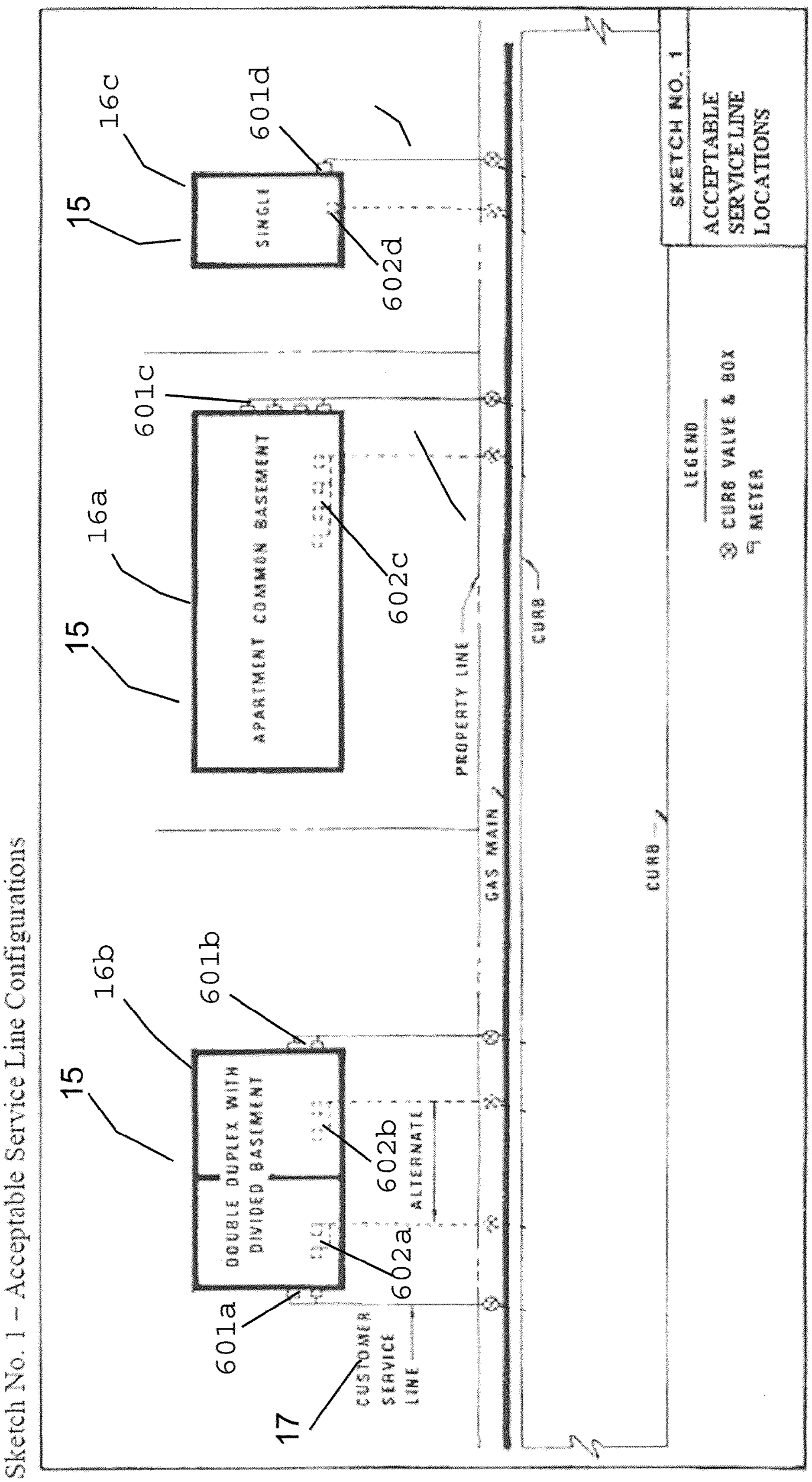
FIG. 6 is a service line configuration according to one embodiment of the invention.

In some embodiments, a gas service line 17 can be fluidly coupled with one or more natural gas meters (such as gas meters 601*a*, 601*b*, 601*c*, 601*d*, or gas meters 602*a*, 602*b*, 602*c*, 602*d* depicted in FIG. 6). In some other embodiments, the portable tanking system 10 can be coupled with the natural gas service line 17 downstream of the natural gas meter 601*a*, 601*b*, 601*c*, 601*d*, 602*a*, 602*b*, 602*c*, 602*d*. In some embodiments, a downstream sensor and/or a smart grid network node can monitor the volume of compressed natural gas supplied by the portable tanking system 10.

Figure 1C:
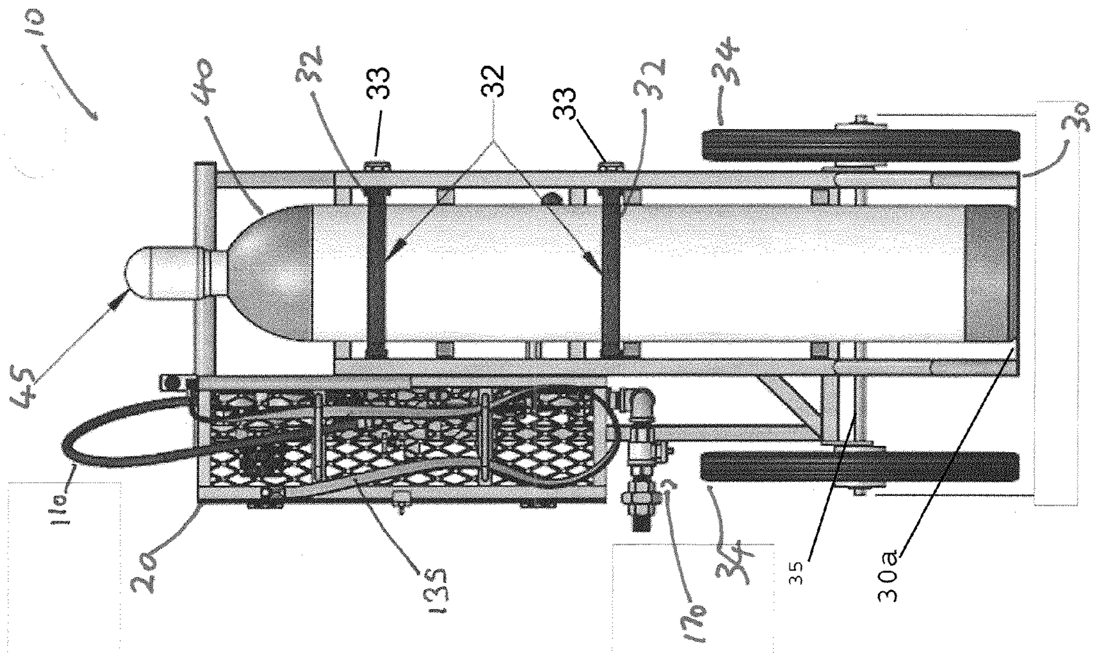
FIG. 1C is a front perspective view of a portable tanking system according to one embodiment of the invention.
Figure 1B:
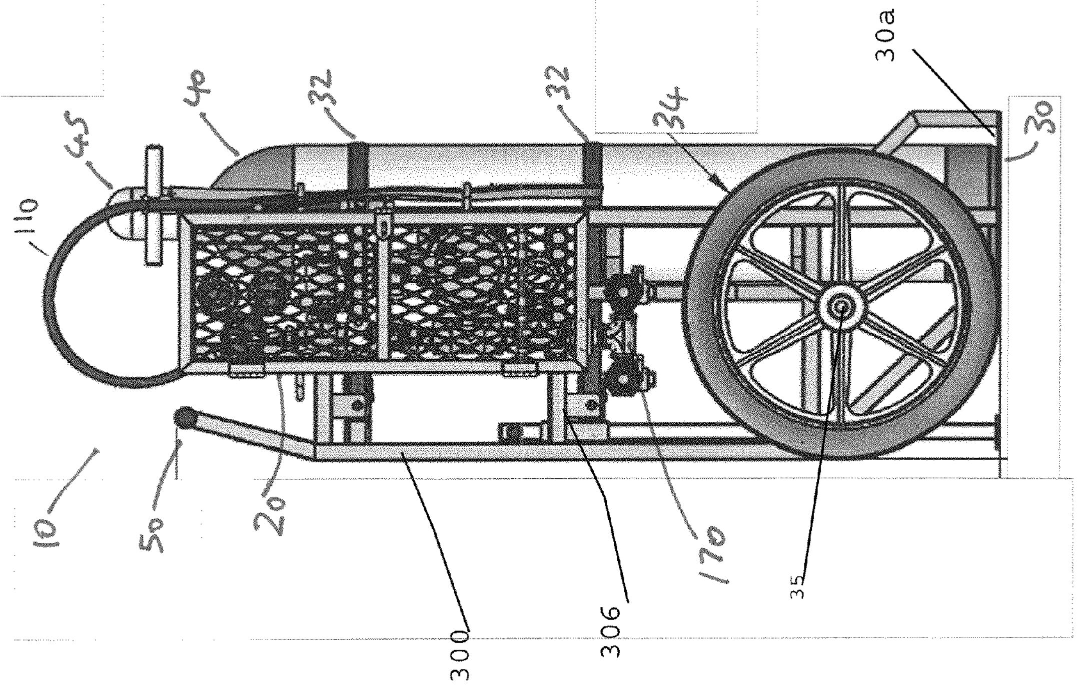
FIG. 1B is a side perspective view of a portable tanking system according to one embodiment of the invention.

Some embodiments provide a portable tanking system 10 that can be easily transferred from one location to another (i.e., it is substantially mobile for transport to a work location, and can also be moved while at the work location). Some embodiments of the invention include a portable tanking system 10 that comprises a regulation apparatus 100 that is portable. For example, in some embodiments, a regulation apparatus 100 can be coupled with a mobile natural gas supply (e.g., a natural gas cylinder 40) to form a portable tanking system 10. Further, in some embodiments, the regulation apparatus 100 can be made portable by installation within a protective cage 180 to form a caged regulation assembly 20 that can be coupled to a mobile transportation carrier. For example, as shown in FIGS. 1A-1C, some embodiments can include a cart 30 coupled with a caged regulation assembly 20 and carrying at least one natural gas tank 40. As shown in FIG. 1A-1C, illustrating a front perspective, front and side views of a portable tanking system 10 according to at least one embodiment of the invention, the system 10 can include a caged regulation assembly 20 coupled to a cart 30 that includes wheels 34 coupled to an axle 35. In some embodiments, the portable tanking system 10 includes a natural gas tank 40 coupled to the cart 30 with retaining straps 32. In some embodiments of the invention, the caged regulation assembly 20 can be repeatedly mounted and decoupled from the portable tanking system 10 to facilitate installation, transportation and storage.

FIG. 1B is a side perspective view of a portable tanking system 10, and FIG. 1C is a front perspective view of a portable tanking system 10 according to one embodiment of the invention. As shown, in some embodiments, one or more downstream valves 170 can exit the caged regulation assembly 20 from a generally bottom location, extending out and away from the portable tanking system 10, generally parallel to the axle 35. In some embodiments, the wheels 34 can be semi-pneumatic wheels. Some embodiments of the invention utilize wheels 34 with a weight capacity of 250 lbs. In some alternative embodiments, the wheels 34 can be solid, non-pneumatic wheels. In some embodiments, the wheels 34 can accommodate a higher weight capacity.

Referring to FIG. 1B, some embodiments of the invention include a high pressure hose 110. In some embodiments, the high pressure hose 110 can be fluidly coupled to at least one source of natural gas. For example, in some embodiments, the high pressure hose 110 can be coupled to a compressed natural gas cylinder 40. In some embodiments, the high pressure hose 110 can be coupled to the portable tanking system 10 via the caged regulation assembly 20 for storage and/or during transportation to a job site.

Figure 4A:
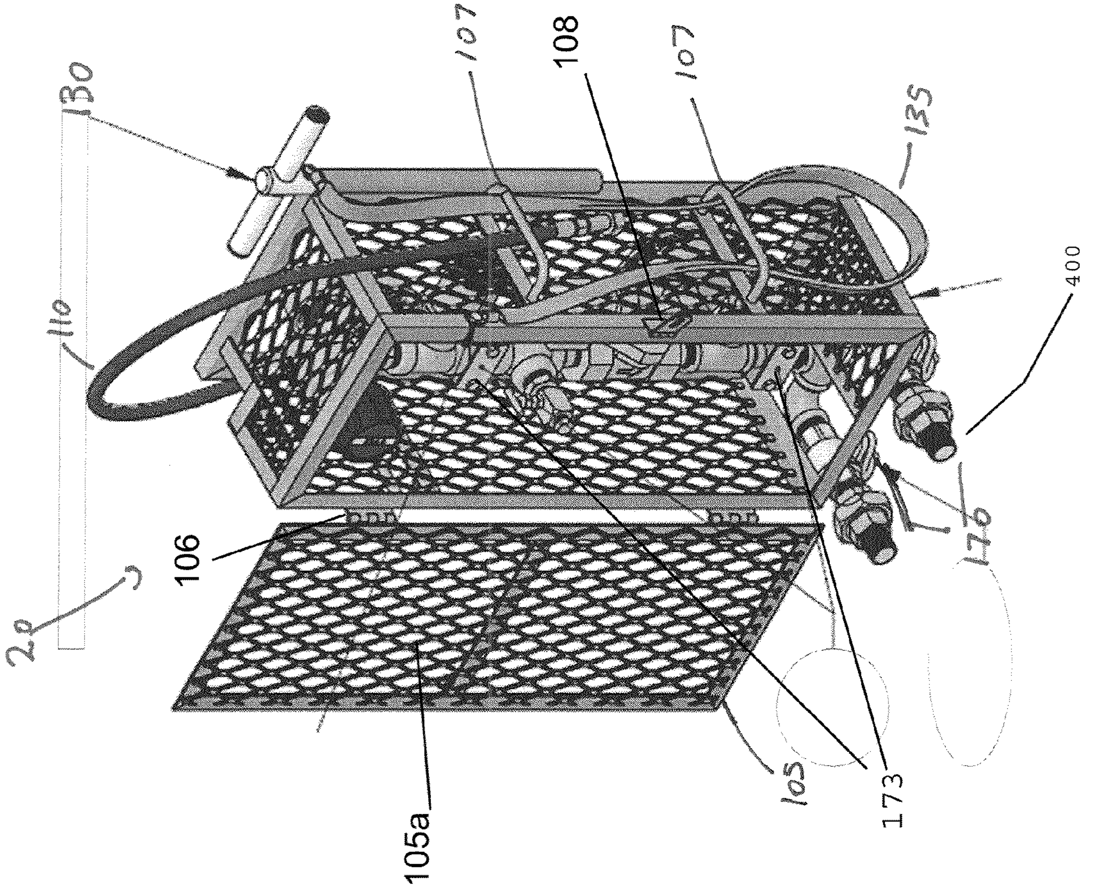
FIG. 4A is a perspective view of a caged regulation assembly according to one embodiment of the invention.
Figure 7:
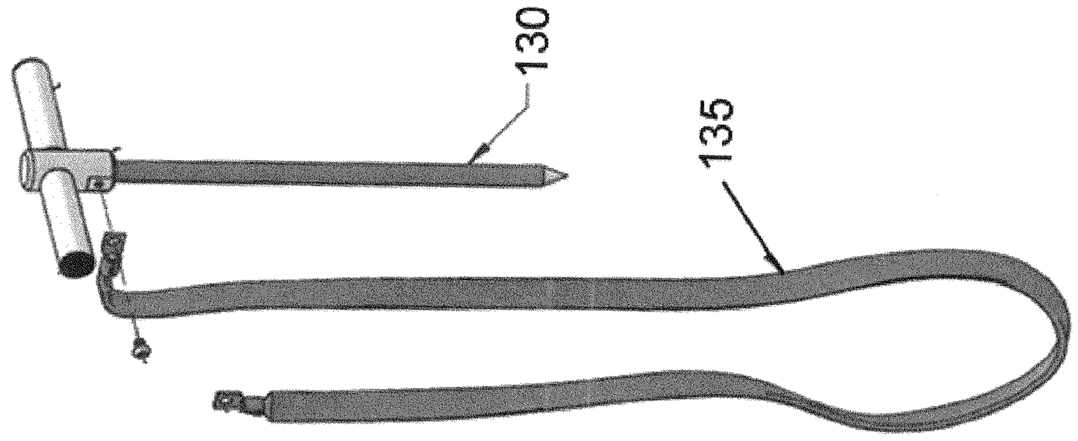
FIG. 7 is a perspective view of a ground rod and a ground strap according to one embodiment of the invention.

Some embodiments of the invention include one or more features that can contribute to the safety, utility and ergonomics of the portable tanking system. For example, referring to FIG. 1C, in some embodiments, the portable tanking system 10 can include a grounding strap 135. In some embodiments, as shown in FIG. 4A, the portable tanking system 10 can include a grounding strap 135 coupled to a grounding rod 130. FIG. 7 is a perspective view of a ground rod 130 and a ground strap 135 according to one embodiment of the invention. The ground rod 130 as shown can include a steel rod including a tapered end. In some embodiments, the rod 130 can also include a generally T-shaped handle. In some embodiments, the grounding strap 135 can include an insulating covering such as a ground braid. In some other embodiments, the grounding strap 135 also can include electrical lugs including screw holes for coupling to the t-shaped handle of the rod 130. In some embodiments, just prior to, and during use of the portable tanking system 10, a user can deploy the grounding rod 130 coupled to the grounding strap 135 to provide an electrical grounding of a natural gas pipe, valve, regulator or other component coupled to the residential or commercial natural gas supply equipment. In some embodiments, the grounding strap 135 can be electrically coupled to the portable tanking system 10. In some embodiments, at least some portion of the grounding strap 135 can be coupled to the caged regulation assembly 20. As depicted in FIG. 4A, in some embodiments, the grounding rod 130 can be coupled to the caged regulation assembly 20, and configured to allow a user to detach and reattach it from and to the cart 30. In other embodiments, the grounding rod 130 can be stored on some other part of the portable tanking system 10 generally accessible to a user.

Some embodiments can include other safety, utility and ergonomic features. For example, as shown in FIGS. 1A and 1B, some embodiments of the cart 30 can include a handle 50 that is positioned generally parallel and inwardly angled towards the axle 35 of the cart 30, and angled generally away from a user. As shown, in some embodiments, the handle 50 can include a generally rod or tubular-shaped substantially horizontal bar to facilitate grasping and holding by a user. In other embodiments, the handle 50 can be a conventional generally rectangular or square-shaped handle (not shown). In some embodiments, the handle 50 can be coupled to each side of the rear frame 300 with supports 55. In some embodiments as illustrated, the supports 55 can be angled inward (i.e. towards the center of the axle 35 of the cart 30). This architecture facilitates a user rotating and moving the system 10, enabling the user to maneuver the portable tanking system 10 in a confined space, and to orient the system 10 by rotating the portable tanking system 10 on its wheels 34.

In some embodiments, when a user wishes to rotate the portable tanking system 10, the user can grasp the handle 50, and pivot the portable tanking system 10 using the wheels 34. In this instance, the user can tip the portable tanking system 10 to release weight from the wheels 34 and maneuver the system 10 by rotating the system 10 in a clockwise, or counter-clockwise direction. In some embodiments, when a user wishes to move the portable tanking system 10 to a new location, the user can grasp the handle 50, and pivot the portable tanking system 10 using the wheels 34 to move the system 10 forward or backward by applying a force to the handle 50 to move the system 10 to a desired location.

Some embodiments of the invention include one or more features that can contribute to the safety and utility of the portable tanking system 10. For example, the compressed natural gas cylinder 40 can be coupled to the cart 30 using at least one strap 32. In some embodiments, the cylinder 40 can be secured by two straps 32, one placed around the cylinder 40 at a substantially central location, and a further strap 32 securing the cylinder 40 at a substantially upper location. In some embodiments, the straps 32 can include conventional fasteners, or a conventional lock and release mechanism to allow swift coupling and release of the cylinder 40 (not shown). In some further embodiments, the cylinder 40 can be coupled to the cart 30 using a conventional gate and latching mechanism (not shown). In some embodiments, the gate can be pivoted open to allow removal of the compressed natural gas cylinder 40. In some other embodiments, the cylinder 40 can be coupled to the cart 30 using a conventional U-shaped bar or U-bolts (not shown). In some further embodiments, the cylinder 40 can be coupled to the cart 30 using a conventional pull-type toggle clamp (not shown).

As shown in at least FIGS. 1A-1C, the cylinder 40 can be supported at its base by a substantially flat base 30*a* portion of the cart 30. In some alternative embodiments, the flat base 30*a* of the cart 30 can be larger or smaller than that shown so as to accommodate various sizes of compressed natural gas cylinders 40, or a plurality of cylinders 40.

Figure 2B:
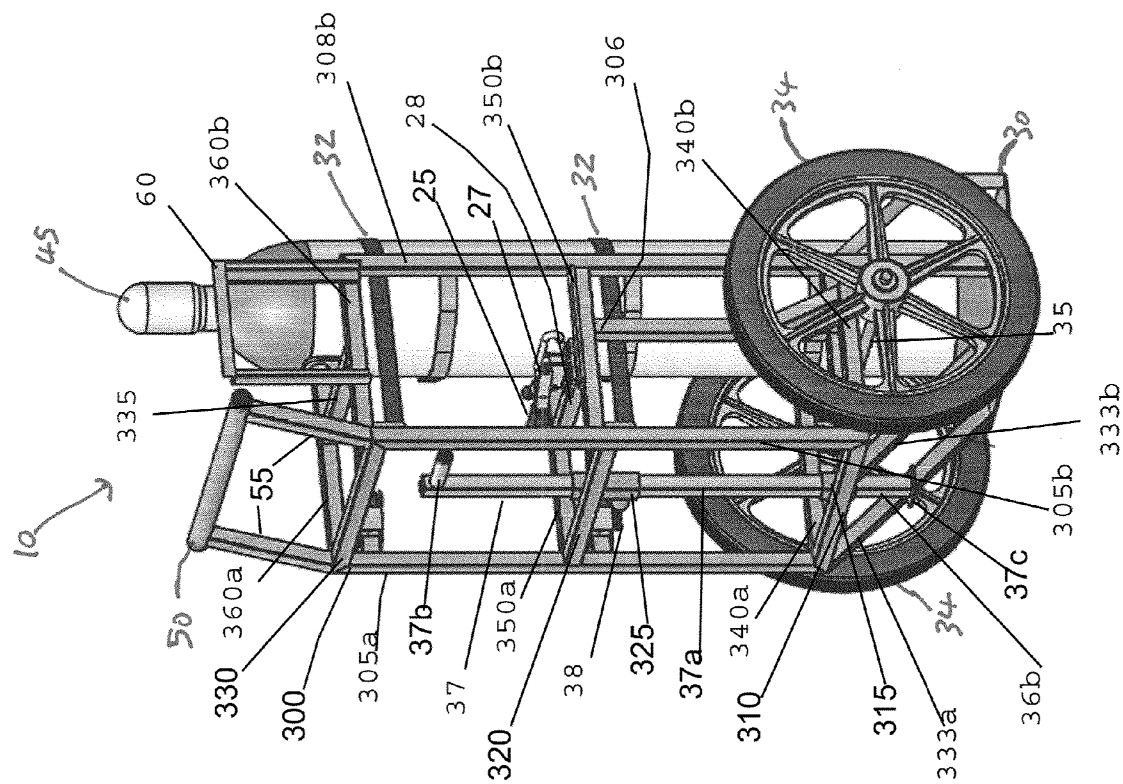
FIG. 2B is a perspective view of a portable tanking system with stabilizer foot retracted according to one embodiment of the invention.
Figure 2A:
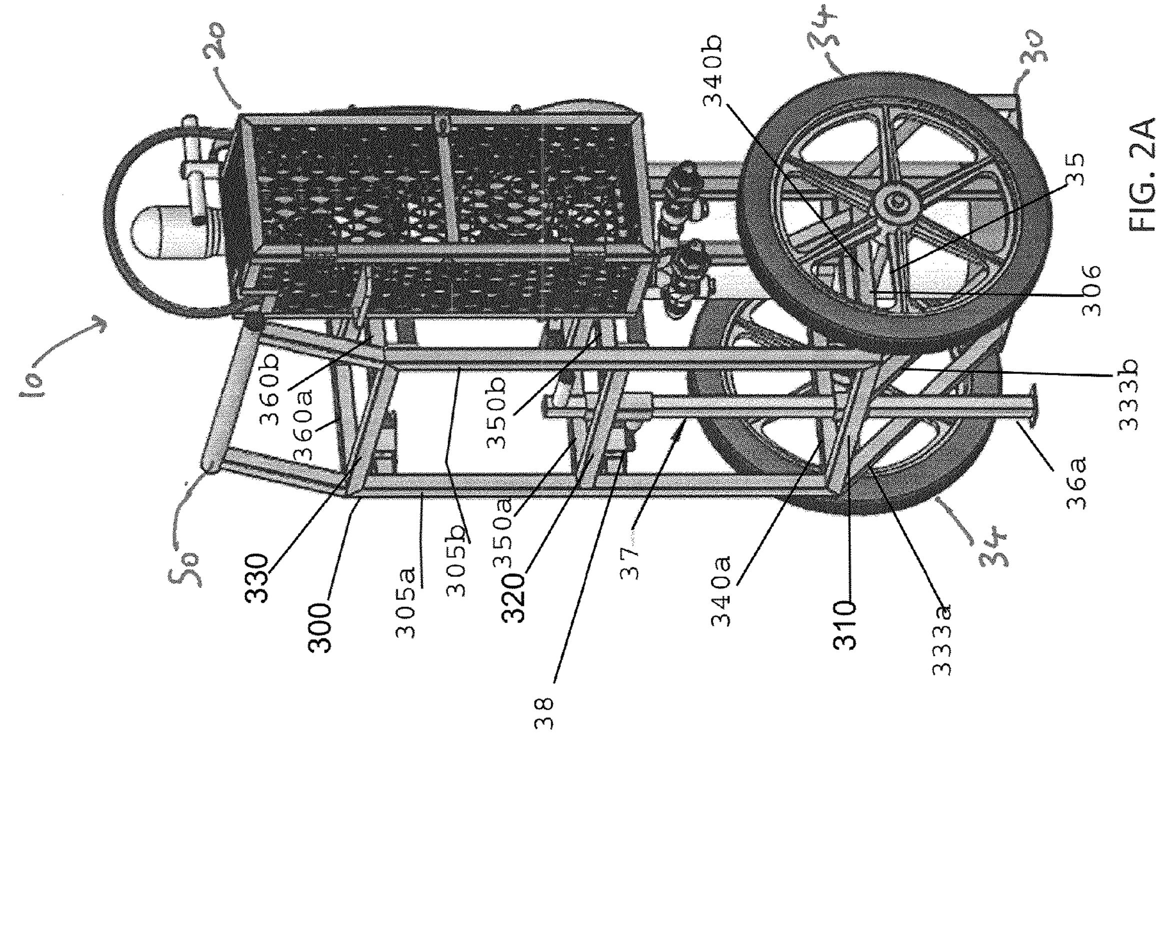
FIG. 2A is a perspective view of a portable tanking system with stabilizer foot deployed according to one embodiment of the invention.
Figure 2D:
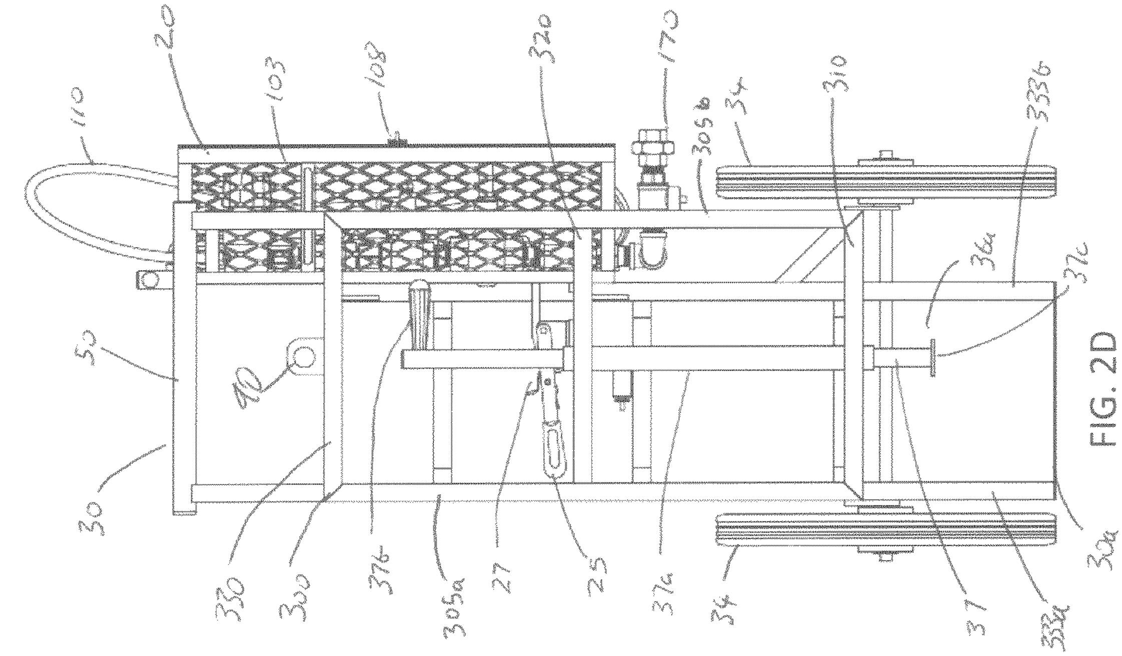
FIG. 2D is a rear view of a portable tanking system without an installed gas cylinder according to one embodiment of the invention.
Figure 2C:
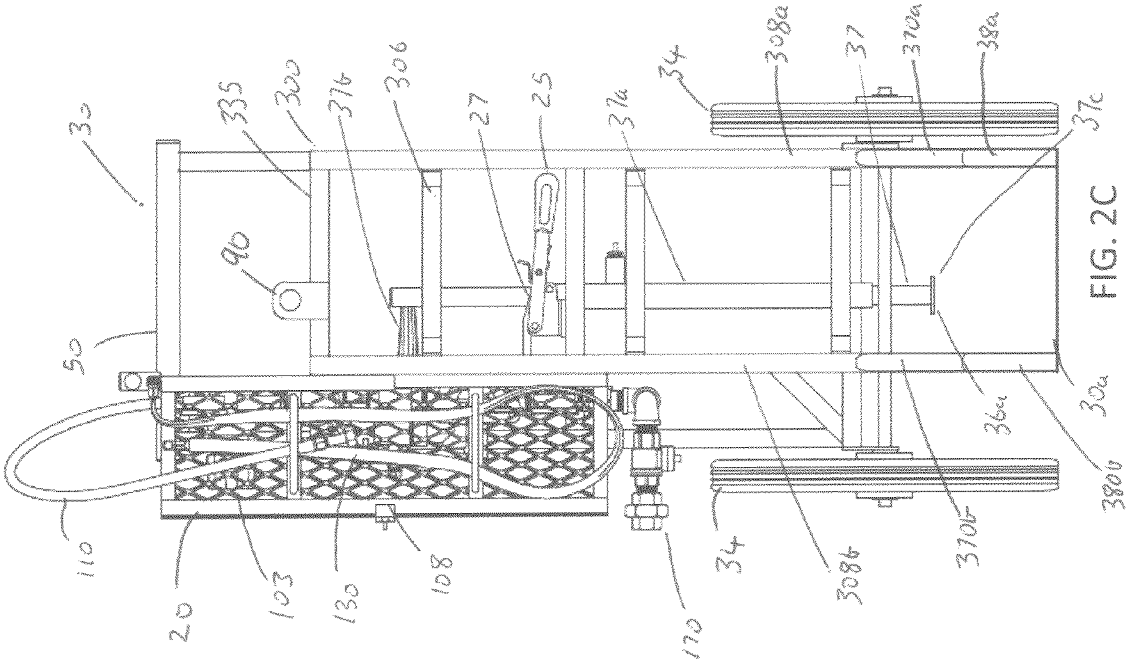
FIG. 2C is a front view of a portable tanking system without an installed gas cylinder according to one embodiment of the invention.

In some embodiments, the cart 30 shown carrying a natural gas cylinder 40 in FIGS. 1A-1C and 2A-2B, and without a cylinder 40 in FIGS. 2C and 2D, can include a rear frame 300 comprising a first vertical support 305*a* and a second vertical support 305*b*. In some embodiments, the cart 30 can include a set of three rear braces including a lower rear brace 310, a middle rear brace 320, and an upper rear brace 330. In some embodiments, the braces 310, 320, 330 can be generally equally spaced and can extend generally horizontally between and coupled to the vertical supports 305*a*, 305*b*, and can be generally parallel to the axle 35. In some embodiments, the rear frame 300 can also be coupled to the flat base 30*a* using at least one lower support bar. For example, as illustrated in FIGS. 2A-2B, and 2D-2E, the rear frame 300 can comprise a first lower support 333*a* coupled to the first vertical support 305*a* and extending inwardly to couple with one corner of the flat base 30*a*, and a second lower support 333*b* coupled to the first vertical support 305*a*, and extending inwardly to couple with an opposite corner of the flat base 30*a*. In some embodiments, the first vertical support 305*a* and the second vertical support 305*b* are positioned substantially equidistant from the axial center of the axle so that the rear frame 300 is generally centrally positioned on the axle 35.

Some embodiments of the invention include the cart 30 comprising the rear frame 300 coupled to a carrier frame 306. In some embodiments, the carrier frame 306 can extend from the rear frame 300 and function to support and cradle at least one natural gas cylinder 40. Further, in some embodiments, the carrier frame 306 can include a first side 307*a* and a second side 307*b*, each of which can function to support a caged regulation assembly 20. For example, in some embodiments, the cart 30 can include a carrier frame 306 that can include a series of side braces extending from each vertical supports 305*a*, 305*b* of the rear frame 300. The side braces can be positioned generally equally spaced, and substantially perpendicular along the length of the vertical supports 305*a*, 305*b*, extending away from the rear frame 300. For example, in some embodiments, the first side 307*a* can comprise a first lower side brace 340*a* coupled to and extending from the first vertical support 305*a*, and a coupled first central side brace 350*a* coupled to and extending from the first vertical support 305*a*, and a coupled first upper side brace 360*a* coupled to and extending from the first vertical support 305*a*.

In some embodiments, the regulation apparatus 100 can be secured to the caged regulation assembly 20. For example, as illustrated in FIG. 4A, in some embodiments, the regulation apparatus 100 can be secured to the caged regulation assembly 20 using one or more clamps 173. In some other embodiments, further clamps 173 can be used and coupled with other locations of the caged regulation assembly 20. In other embodiments, alternative fastening mechanisms can be used.

In some further embodiments, the caged regulation assembly 20 can be secured to the cart 30. In some embodiments, the portable tanking system 10 includes a mount 60 to which the caged regulation assembly 20 can be slidably mounted. In some embodiments, the mount 60 can comprise a square frame including a substantially horizontal bar coupled to at least some portion of the cart 30 using two vertical bars. For example, in some embodiments, the mount 60 can be coupled to the upper side brace 360*b* of the second side 307*b* of the carrier frame 306 (see FIG. 2B) by coupling the two vertical bars to the second upper side brace 360*b* of the carrier frame 306. In some other embodiments, the mount 60 can be coupled to other portions of the cart 30, including for example the first side of the carrier frame 307*a*, or to at least some portion of the rear frame 300. Further, as shown in FIG. 1A, 2B-2D, some embodiments include a pull toggle clamp 25 that can be actuated to hold and secure the caged regulation assembly 20 to the cart 30. The pull toggle clamp 25 is coupled to a toggle mechanism 27. The toggle mechanism 27 can be mounted to some portion of the cart 30, such as the central cross-bar 28 which can extend between the central side braces 350*a*, 350*b* of the carrier frame 306 (see for example FIG. 2B, as well as the illustrations in FIGS. 2C-2D that show the cart 30 without an installed natural gas cylinder 40).

In some embodiments of the invention, the caged regulation assembly 20 can be repeatedly mounted to or decoupled from the portable tanking system 10 to facilitate installation, transportation and storage. For example in some embodiments, the caged regulation assembly 20 can be repeatedly mounted to or decoupled from the mount 60 positioned on the second side 307*b* of the carrier frame 306. In other embodiments, alternative fastening mechanisms can be used. For example, the pull toggle clamp 25 can, in some embodiments, be a conventional toggle clamp. In some other embodiments, the caged regulation assembly 20 can be secured to the cart 30 using a system of conventional pins and sockets. For instance, some embodiments can include a cart 30 with conventional pins configured and arranged to engage conventional sockets on the caged regulation assembly 20 (not shown). In some other embodiments, the cart 30 can include a system of conventional slides or posts that can be used to reversibly mount the caged regulation assembly 20 (not shown).

In some embodiments, the first lower side brace 340*a*, the first central side brace 350*a*, and the first upper side brace 360 can each be coupled to a first front support 308*a*. Moreover, the first front support 308*a* can be positioned coupled to the flat base 30*a* at one end adjacent to one side of the flat base, and can be extend from the flat base 30*a* substantially parallel with the first and second vertical supports 305*a*, 305*b*, coupling with the first upper side brace 360 at an opposite end of the flat base 30*a*. In some embodiments, the second side 307*b* of the carrier frame 306 can include a further series of braces extending from the rear frame 300 and coupling with a second front support 308*b* of the carrier frame 306. For example, the second front support 308*b* can be positioned substantially parallel to the first front support 308*a*, and can be coupled to the flat base 30*a* on an opposite side to the first front support 308*a*. A coupled second lower side brace 340*b* can extend from the second vertical support 305*b* of the rear frame 300 and couple with the second front support 308*b* of the carrier frame 306. Further, a coupled second central side brace 350*b*, and a coupled second upper side brace 360*b*, can extend from the second vertical support 305*b* of the rear frame 300, and couple with the second front support 308*b* of the carrier frame 306 in some embodiments.

In some embodiments, the second side braces 340*b*, 350*b*, 360*b* of the second side 307*b* of the carrier frame 306 can be coupled to the rear braces 310, 320, 330 of the rear frame 300 at some inward distance from the second vertical support 305*b* (i.e., inwardly positioned along the rear braces 310, 320, 330 from the second vertical support 305*b* towards the first vertical support 305*a*). For example, in some embodiments, a coupled second lower side brace 340*b* can extend from the rear frame 300 substantially perpendicular from the lower rear brace 310, and couple with the second from support 308*b*, and the coupled second central side brace 350*b* can extend from the rear frame 300 substantially perpendicular from the middle rear brace 320, and couple with the second from support 308*b*. Further, the coupled second upper side brace 360*b* can extend from the rear frame 300 substantially perpendicular from the upper rear brace 330, and couple with the second from support 308*b*. In some embodiments, by positioning the braces 340*b*, 350*b*, 360*b* inward from the second vertical support 305*b*, carrier frame 306 is positioned on the axle 35 substantially off-center so that the first side 307*a* is positioned substantially further from the axial center of the axle 35 than the second side 307*b*, and a gap can be formed between the second front support 308*b* and the wheel 34. In this embodiment, a substantial portion of a coupled caged regulation assembly 20 can be positioned over the axle 35 when attached to the second side 307*b* of the carrier frame 306. This architecture can provide stability to the portable tanking system 10 by assuring a greater proportion of the weight of the portable tanking system 10 resides over the axle.

Figure 2E:
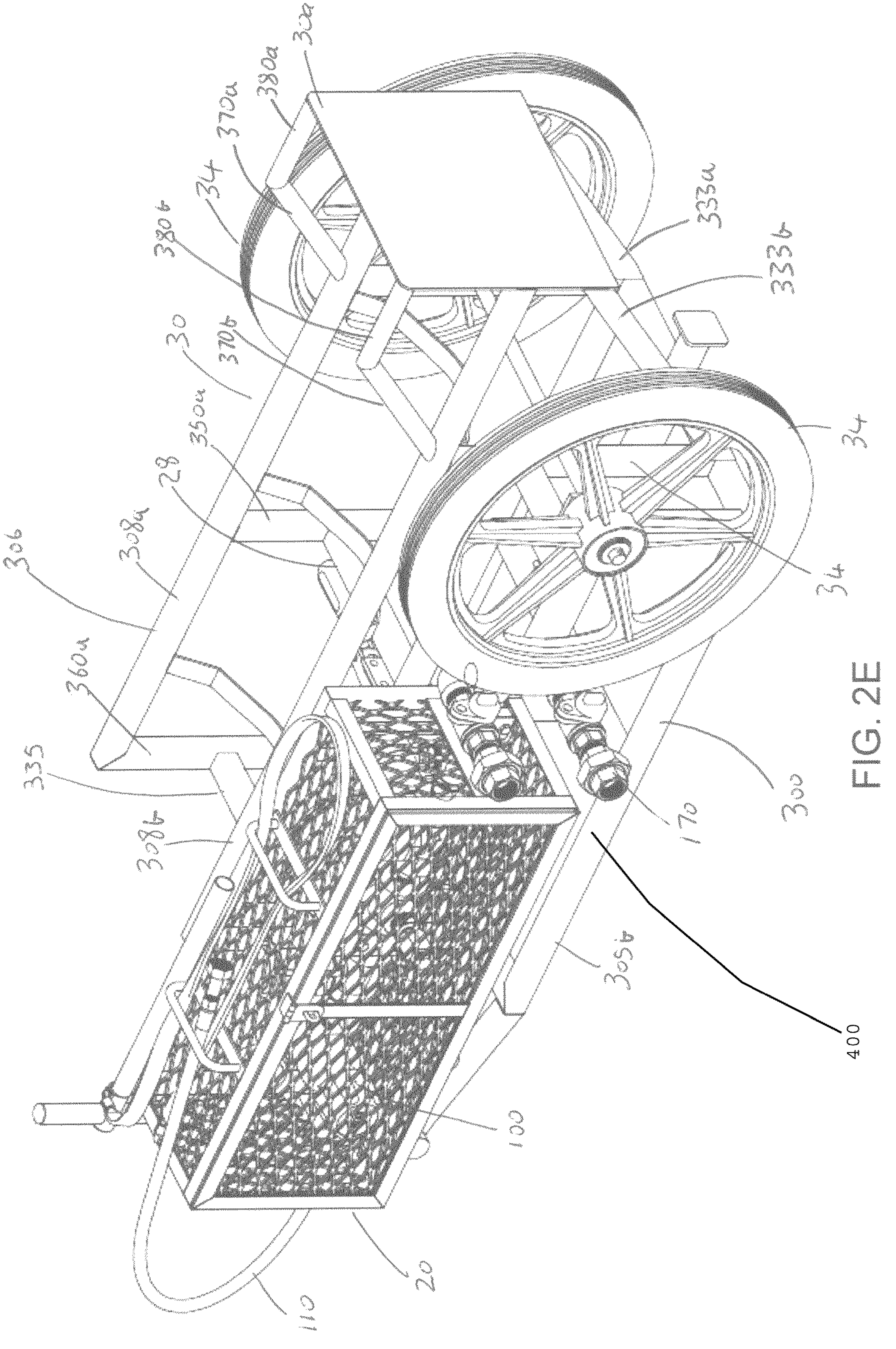
FIG. 2E shows a perspective view of the tanking system without an installed gas cylinder according to one embodiment of the invention.

In some embodiments, the flat base 30*a* can provide further support to the front supports 308*a*, 308*b*. For example, as illustrated in FIG. 1A, and further illustrated in FIG. 2E showing a perspective view of the tanking system 10 without an installed gas cylinder 40, in some embodiments, the cart 30 can include a first thigh section 370*a* extending from the first front support 308*a*, and a second thigh section 370*b* extending from the second front support 308*b*. Each thigh section 370*a*, 370*b* can be coupled to the flat base 30*a* using a substantially vertical calf section coupled to the flat base 30*a* at opposite corners. For example, in some embodiments, the first front support 308*a* can couple with a first calf section 380*a* that can extend from one corner of the flat base 30*a*, and the second thigh section 370*b* can couple with a second calf section 380*b* that can extend from an opposite corner to the first calf section 380*a*. In some embodiments, the calf sections 380*a*, 380*b* can extend a greater or lesser distance from the flat base 30*a*. For example, in some embodiments, the calf sections 380*a*, 380*b* can comprise a longer length than illustrated, and can couple with shorter thigh sections 370*a*, 370*b*. In some other embodiments, the calf sections 380*a*, 380*b* can comprise a shorter length than illustrated, and can couple with longer thigh sections 370*a*, 370*b*. In some other embodiments, the thigh sections 370*a*, 370*b* can extend to couple with the flat base 30*a* directly (i.e., without the use of coupled calf sections 380*a*, 380*b*).

Some embodiments of the invention include additional features that can contribute to the safety and utility of the portable tanking system 10. In some embodiments, the portable tanking system 10 can utilize an integrated mechanical stabilizer assembly. For example, FIG. 2A is a perspective view of a portable tanking system with stabilizer foot 37 deployed in a deployed position 36*a* according to one embodiment of the invention. FIGS. 2C and 2D illustrate front and rear views of the portable tanking system 10 without an installed gas cylinder, and provide further views of the stabilizer foot 37 in a retracted position 36*b*. In accordance with some embodiments, the cart 30 can include at least one stabilizer foot 37 that can be moved from a deployed position 36*a* to a retracted position 36*b*, or vice-versa. In some embodiments, a user can actuate and extend the stabilizer foot 37 using a grip 37*b* to mechanically extend the foot shaft 37*a* to a deployed position 36*b*. In this instance, the foot shaft 37*a* can move within one or more guides positioned on the cart 30. For example, the shaft 37*a* can move within an upper foot guide 325 and a lower foot guide 315 that are coupled to at least one of the braces 310, 320, 330. As illustrated in FIG. 2B, in some embodiments, the upper foot guide 325 can be coupled to the middle front brace 320, and the lower foot guide 315 can be coupled to the lower front brace 310.

In some embodiments, a user can actuate and extend the stabilizer foot 37 to a position 36*a* to provide stability and/or a braking action. For example, in some embodiments, a user can retract the release mount 38 to allow movement of the stabilizer foot 37, and extend the stabilizer foot 37 to a position 36*a*. Further, in some embodiments, the user can actuate the release mount 38 to allow movement of the stabilizer foot 37, and retract the stabilizer foot 37 to a position 36*b*. In some further embodiments, a user can actuate and retract the stabilizer foot 37 to a position 36*a* to allow the cart 30 to be maneuvered (i.e., to be rotated and/or to be moved to another position). For example, FIG. 2B is a perspective view of a portable tanking system 10 with stabilizer foot 37 retracted to a position 36*b* according to one embodiment of the invention. As an example, following transportation of the portable tanking system 10 to a location, a user can extend the stabilizer foot 37 to a position 36*a* just prior to parking the portable tanking system 10. The user can extend the stabilizer foot 37 from the retracted position 36*a* to a deployed position 36*b* when the portable tanking system 10 is stationary, in order to hinder, or to substantially prevent further movement of the assembly 10.

In some embodiments, the stabilizer foot 37 can include an enlarged end (e.g., a ground pad 37*c*) to increase the surface area for contact with a surface. In some other embodiments, the end of the stabilizer foot 37 can include a coating or covering. For example, in some embodiments, the stabilizer foot 37 can include a zinc coating. In some other embodiments, the end of the stabilizer foot 37 can include other coatings or covers to increase wear resistance, and/or corrosion resistance. In some embodiments, the stabilizer foot 37 can include a coating or covering to further increase traction or stability (for example, a rubber-based coating or covering).

As shown in FIG. 2B, in some embodiments, the stabilizer foot 37 can be retracted to a position 36*b*. As depicted in FIG. 2A, in some embodiments, just prior to movement of the portable tanking system 10, a user can actuate the stabilizer foot 37 from a deployed position 36*b* to a retracted position 36*a*. In this instance, the stabilizer foot 37 initially in a position 36*b*, can move away from a ground surface, and that can be positioned substantially away from the ground surface to a refracted position 36*b* as illustrated in FIG. 2B. While in this position, a user can proceed to move the portable tanking system 10 without resistance caused by a coupling of the stabilizer ground pad 37*c* with a ground surface. In some embodiments, a user can again operate the stabilizer foot 37 to a deployed position 36*a* to further hinder, or substantially prevent movement of the portable tanking system 10.

As illustrated thus far in FIGS. 1A-1C and 2B, the caged regulation assembly kit 10 can include a single compressed natural gas cylinder 40. In some other embodiments, the caged regulation assembly kit 10 can be configured to carry more than one conventional gas cylinder 40 (not shown). For example, in some embodiments, the cart 30 can be configured with more than one conventional bay in order to accommodate one than one gas cylinder 40 (not shown). In some embodiments, the portable tanking system 10 can be fluidly coupled to the regulation apparatus 100 using a conventional cylinder of a size that is smaller or larger than the gas cylinder 40 shown in FIGS. 1A-1C and 2B.

In some embodiments, the gas cylinder 40 can include a safety cap 45 designed to protect the gas cylinder 40 valve during transportation, storage, or while in use. In some embodiments, the safety cap 45 includes a convention security or anti-tamper device such as a safety pin (not shown). In some embodiments, the safety pin can include a conventional wire, chain, lanyard or leash in order to prevent loss of the safety pin (not shown). Furthermore, in some embodiments, the safety cap 45 can include a conventional wire, chain, lanyard or leash in order to prevent loss of the safety cap 45 upon removal from the gas cylinder 40 (not shown).

In some embodiments, the safety cap 45 can be present during loading of the gas cylinder 40 into the cart 30, during storage of the portable tanking assembly 10, or during transporting of the assembly 10 to a natural gas customer 15. In some embodiments, just prior to use of the portable tanking assembly 10, the safety cap 45 can be removed. In some embodiments, following removal of the safety cap 45, the high pressure hose 110 can be fluidly coupled with the gas cylinder 40.

Figure 3A:
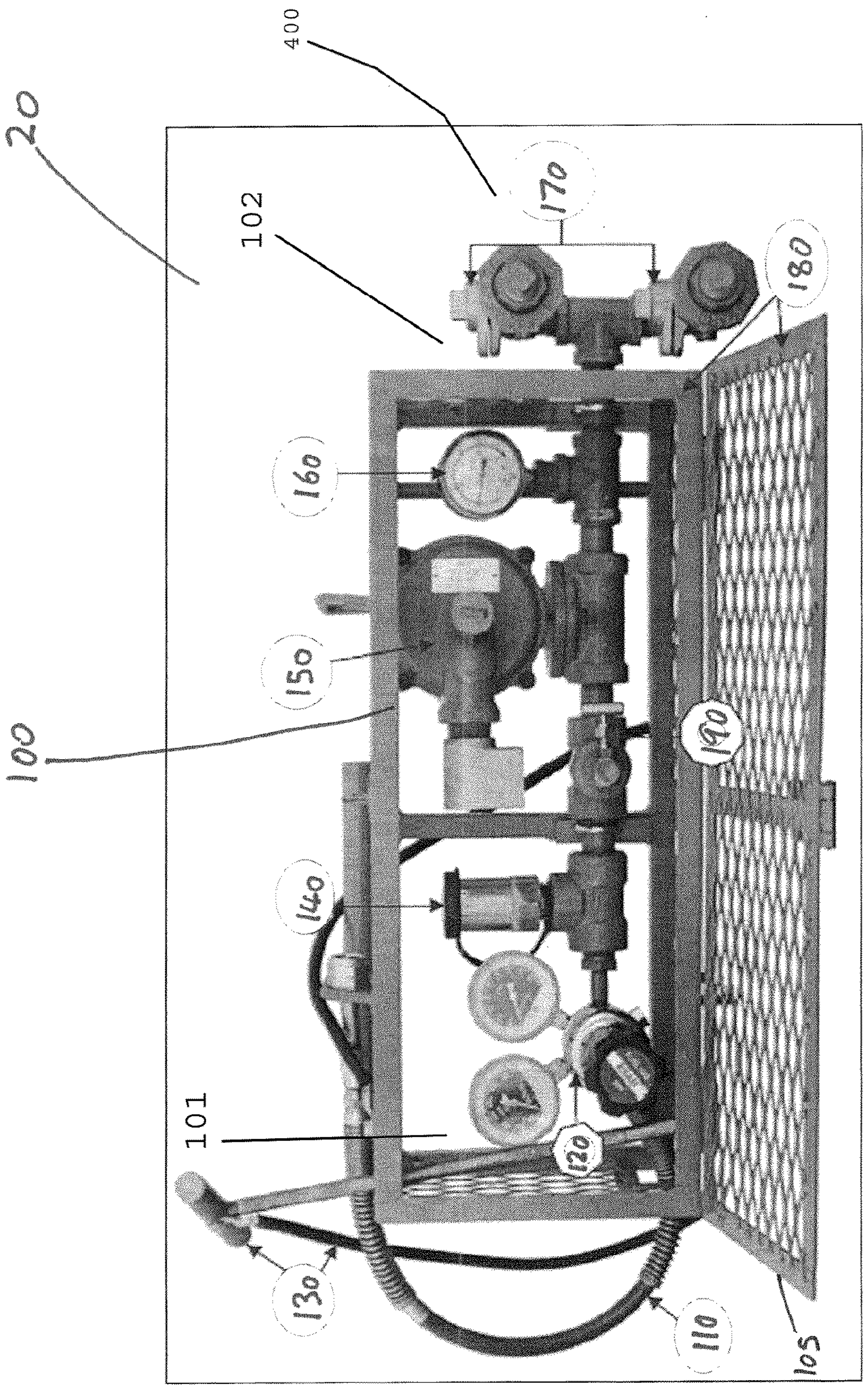
FIG. 3A is a front view of a caged regulation assembly according to one embodiment of the invention.
Figure 3B:
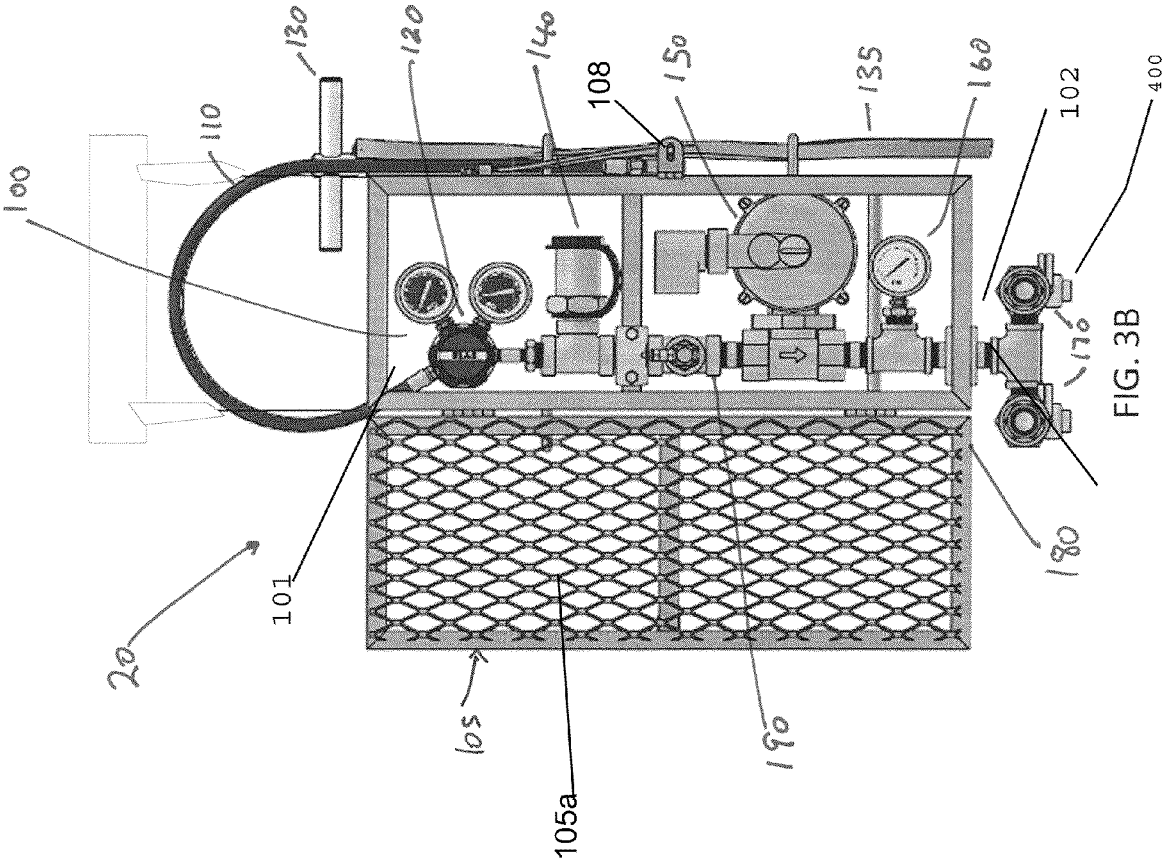
FIG. 3B is a front perspective view of a caged regulation assembly according to one embodiment of the invention.

Some embodiments of the invention provide a caged regulation assembly 20 include a detachable safety cage with a lock. As shown in FIGS. 3A and 3B, in some embodiments, the portable tanking system 10 can include a regulation apparatus 100 installed within a caged regulation assembly 20. In some embodiments, the regulation apparatus 100 can include a series of fittings, safety devices and other components arranged to provide natural gas from an upstream supply end 101 and capable of coupling with a natural gas meter 601*a*-601*d*, 602*a*-602*d* via a downstream delivery side 102. In some embodiments, the series of fittings, safety devices and other components of the regulation apparatus 100 are configured and arranged from the upstream supply end 101 to the downstream delivery side 102 substantially within the caged regulation assembly 20. In some embodiments, some components of the apparatus 100 can at least partially extend outside of the assembly 20, including, but not limited to the high pressure hose 110 coupled to the upstream supply end 101, and the downstream delivery end 102 that can comprise downstream valves 170 or a distribution manifold assembly 700.

In some alternate embodiments of the invention, the portable tanking system 10 can include more than one caged regulation assembly 20. For example, some embodiments of the invention include a portable tanking system 10 that can include a plurality of caged regulation assemblies 20 of different sizes. For instance, some embodiments can include an assembly 20 designed to contain a 0.5 lb regulation apparatus 100, and a further assembly 20 designed to contain a 2 lb regulation apparatus 100. In some embodiments, at least two caged regulation assemblies 20 can be mounted on one side of the cart 30 (either on of the sides 307*a*, 307*b*), whereas in some alternate embodiments, at least two caged regulation assemblies 20 can be mounted on opposite sides of the cart 30 (one assembly 20 on each of the sides 307*a*, 307*b*).

In some embodiments, the portable tanking system 10 can include at least one caged regulation assembly 20 with regulation apparatus 100 configured to deliver a supply of natural gas at different pressures. For example, in some embodiments, the portable tanking system 10 can include a single caged regulation assembly 20 housing at least two low pressure regulators capable of supplying natural gas under at least two different pressures. In some other embodiments, the regulation apparatus 100 can include a plurality of caged regulation assemblies 20 including at least two low pressure regulators capable of supplying natural gas to a customer 15 with at least two different pressures.

Figure 4C:
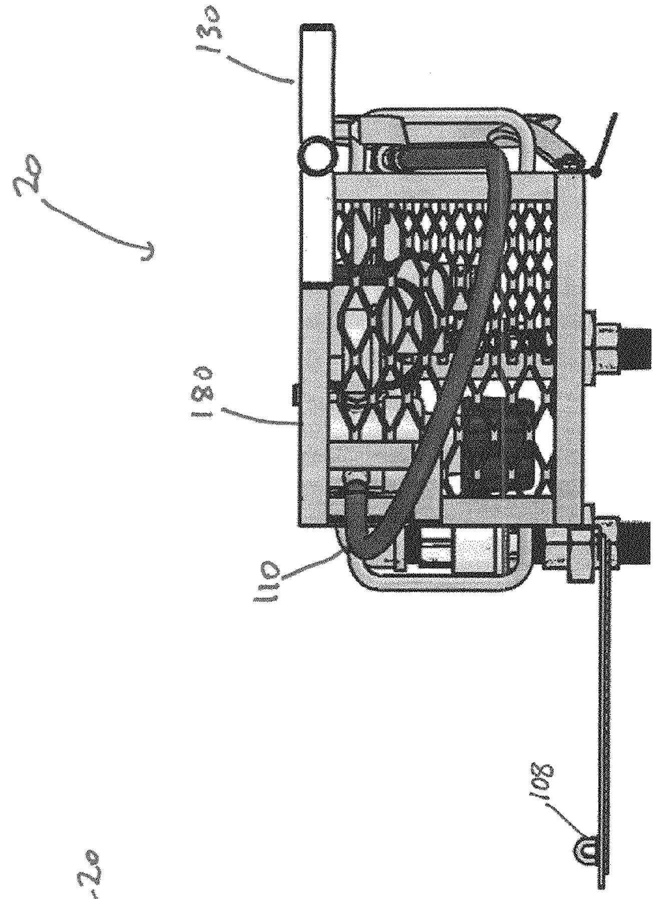
FIG. 4C is a side perspective view of a caged regulation assembly according to one embodiment of the invention.
Figure 4B:
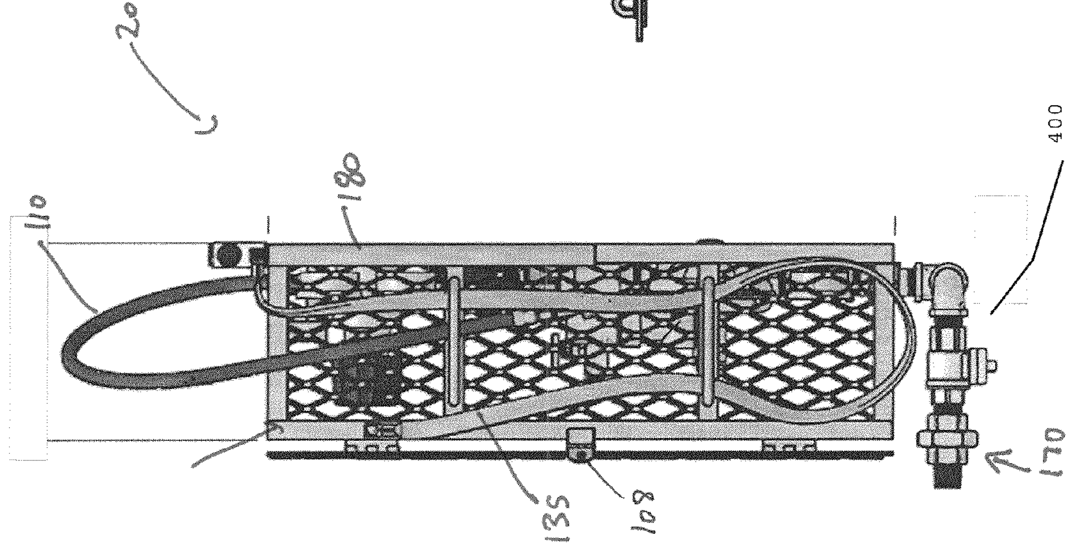
FIG. 4B is a rear perspective view of a caged regulation assembly according to one embodiment of the invention.

FIG. 3A shows a front view of a caged regulation assembly 20, and FIG. 3B shows a front perspective view of the caged regulation assembly 20 according to one embodiment of the invention. In some embodiments, the cage 180 comprises a main cage 103 that can comprise a generally rectangular five-sided box frame that includes a hinged access door 105 coupled to the main cage 103 using hinges 106. The hinged access door 105 can include at least one lock 108 to provide safety and security access to the regulation apparatus 100. In some embodiments, the cage 180 can include handles 107 for transportation and mobility. For example, FIG. 4A shows a perspective view of a caged regulation assembly 20 according to one embodiment of the invention showing the hinged access door 105 and the cage handles 107, and FIGS. 4B and 4C, show rear and side perspective views of a caged regulation assembly 20 showing the lock 108 according to one embodiment of the invention.

In some embodiments, each side of the cage 180 including the five sides of the main cage 103 and the door 105 can include a mesh portion 105*a*. The mesh portion 105*a* can enable ventilation of the cage 180, allowing flow of air past the enclosed regulation apparatus 100. The use of the mesh portion 105*a* allows visual inspection of the apparatus 100, while also allowing air to flow through the cage 180 to dilute leaked flammable gases (e.g., natural gas).

In some embodiments, at least one conventional lifting eyelet 90 can be including in the portable tanking system 10 in order to facilitate lifting by a crane or hoist (see FIGS. 2C and 2D). The lifting eyelet 90 can be coupled to the cart in a generally central location, including for example by coupling to a generally central position on the upper central brace 335 (see FIGS. 2B and 2C).

Referring to FIGS. 1A-1C, 2A-2B, 3A-3B, 4A-4C, some embodiments of the invention can include various substantially flat, or substantially rectangular or square-shaped components and materials. For example, in some embodiments, one or more components of the portable tanking system 10, including, but not limited to the caged regulation assembly 20 and the cart 30, can include one or more bars or rods that are substantially flat, or substantially rectangular or square-shaped. Some embodiments include a solid bar or rod, whereas in some other embodiments, at least one component can include a tubular and/or substantially hollow component to facilitate weight reduction.

In some embodiments, one or more of the fittings, valves or pipes, or other components of the portable tanking system 10 can comprise iron. For example, in some embodiments, one or more components of the regulation apparatus 100 may comprise iron, wherein at least one of the fittings, valves or pipes can comprise a schedule 40 metallic pipe (black or galvanized iron pipe).

In some embodiments, one or more components of the portable tanking system 10 can include a material that comprises steel, or a related iron composition. For example, in some embodiments, the caged regulation assembly 20 can comprise a steel frame. Moreover, in some embodiments, one or more components of the cart 30 can comprise steel. In some embodiments, one or more components of the portable tanking system 10, including the caged regulation assembly 20, can be assembled using welding. In some other embodiments, one or more components of the portable tanking system 10, including the caged regulation assembly 20 can be assembled and coupled using rivets, bolts, screws, press-fitting, or other fastening mechanisms known in the art.

Some embodiments of the invention can include alternative materials. For example, in some embodiments, at least one component of the portable tanking system 10 can include a metal other than steel. For example, in some embodiments, one or more aluminum components can be used to at least partially reduce weight. Some embodiments of the portable tanking system 10 can include non-metallic materials. For example, in some embodiments, one or more components of the caged regulation assembly 20 or the cart 30 can include a plastic or other polymeric material, and/or a fiberglass composite.

Some embodiments of the invention can include a material that is powder-coated. For example, some embodiments can include a coating that confers corrosion resistance to one or more iron-coating materials within the portable tanking system 10. Other embodiments can include a coating or covering that provides convenience or safety to a user. For example, in some embodiments, one or more components of the portable tanking system 10 can include a flexible and/or impact, and/or vibration absorbing material. For example, in some embodiments, either one or all of at least some portion of the pull toggle clamp 25, the stabilizer foot 37, or the handle 50 can be coated or otherwise covered with an elastomeric material or other polymer material. In some embodiments, the coated or otherwise covered component of the portable tanking system 10 can provide improved stability, wear and/or corrosion resistance, safety and/or user-comfort. In some other embodiments, the coating can include paint. For example, in some embodiments, the portable tanking system 10 can include a surface at least partially coated with high visibility paint, including, but not limited to an orange paint, a yellow paint and a red paint. In some further embodiments, the paint can include a substantially luminous material suitable for providing increased visibility in low light environments. In some other embodiments, the portable tanking system 10 can include a surface at least partially coated with an anti-corrosion coating or paint to protect against corrosion.

Referring to FIGS. 1A-1C, 2A-2B, 3A-3B, 4A-4C and 5A-5C, the various illustrations can include embodiments for delivery of natural gas. In some embodiments, natural gas can comprise predominately methane. In some other embodiments, the natural gas can include at least one of ethane, propane, butane, carbon dioxide, oxygen, nitrogen, hydrogen sulfide, and other rare gases such as helium, neon, argon or xenon. In some embodiments, the various embodiments of the invention as illustrated in FIGS. 1A-1C, 2A-2B, 3A-3B, 4A-4C and 5A-5C, can include embodiments for delivery of natural gas with varying composition. Some other embodiments can include embodiments for delivery of fluids other than natural gas, including, but not limited to ethane, butane and propane, or combinations thereof.

In accordance with some embodiments of the invention, a portable tanking system 10 can be provided to facilitate uninterrupted service to natural gas customers 15 when a natural gas service line 17 undergoes replacement, or when a natural gas service line 17 undergoes maintenance. In some other embodiments, a portable tanking system 10 can be provided to facilitate uninterrupted service to natural gas customers 15 when a gas meter set undergoes maintenance.

Figure 5A:
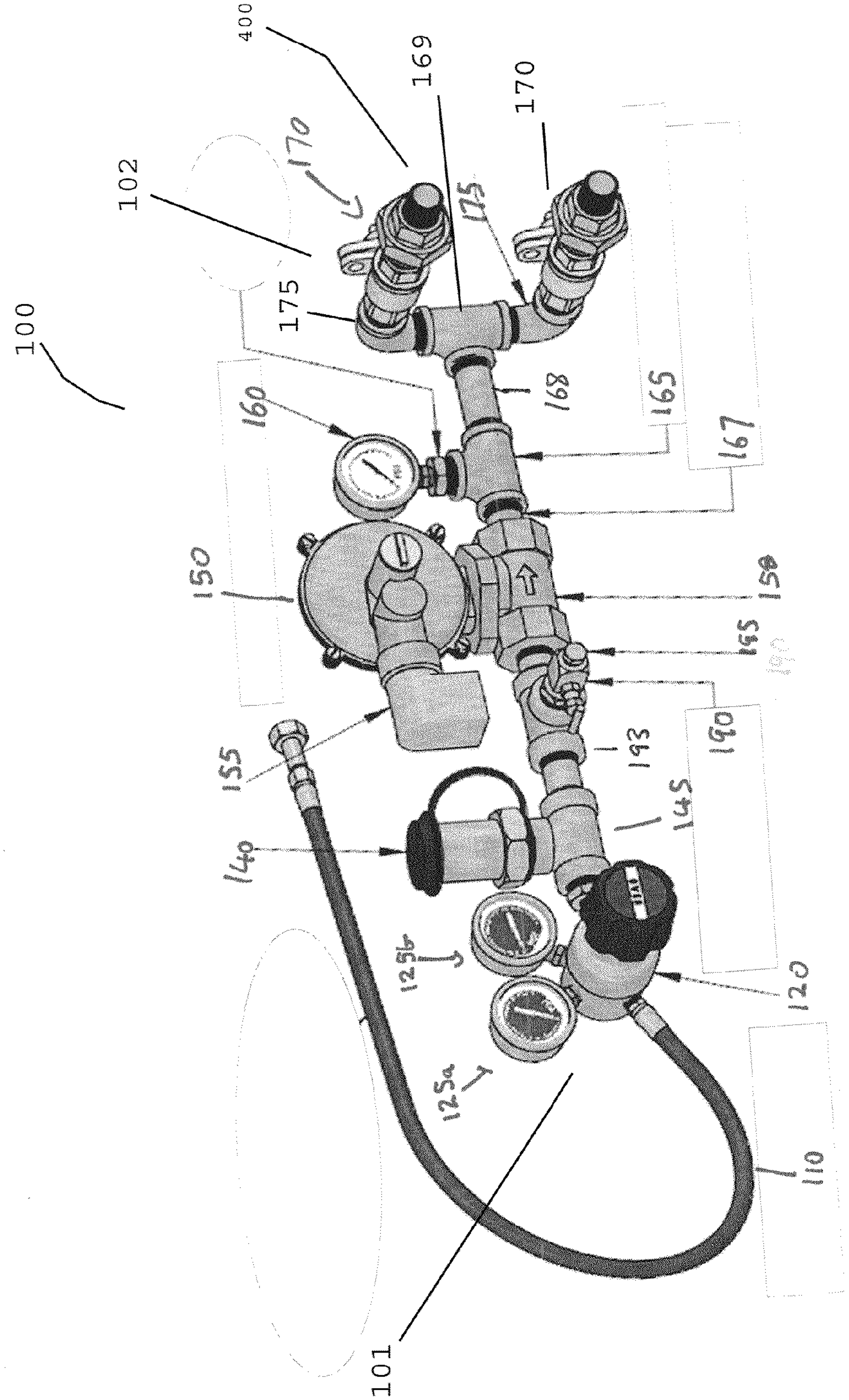
FIG. 5A is a perspective view of a regulation apparatus according to one embodiment of the invention.
Figure 5B:
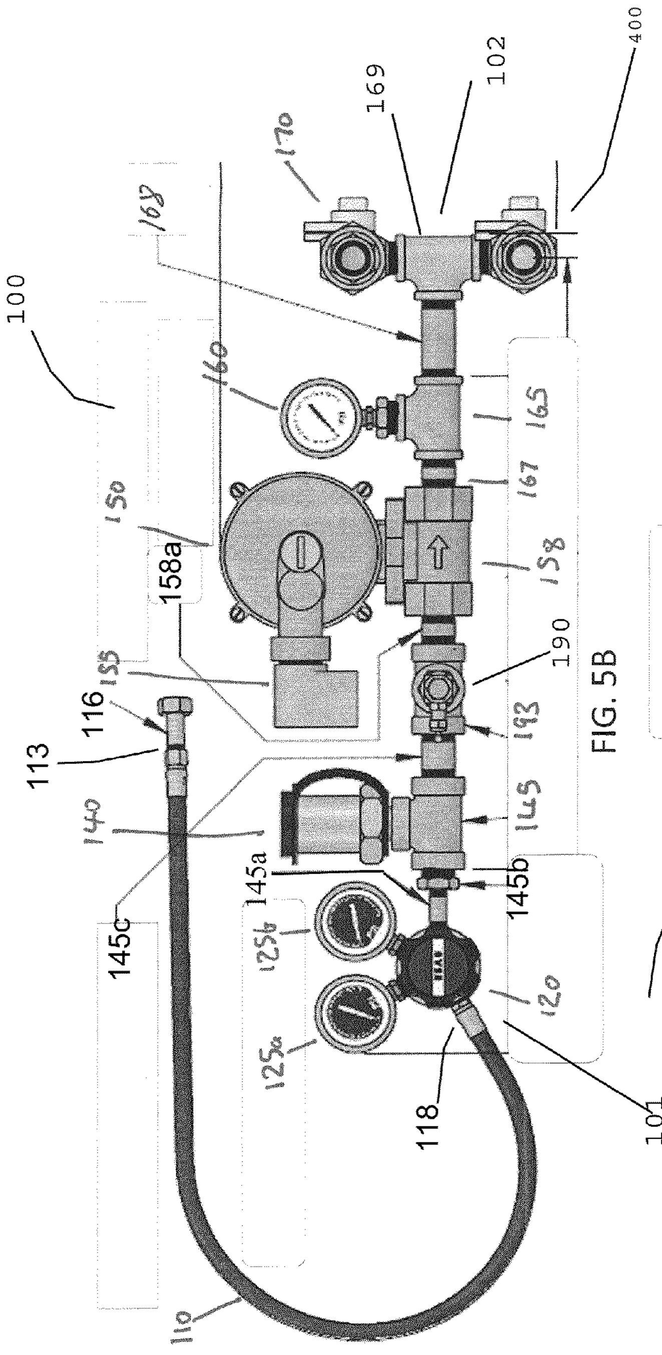
FIG. 5B is a front perspective view of a regulation apparatus according to one embodiment of the invention.
Figure 5C:
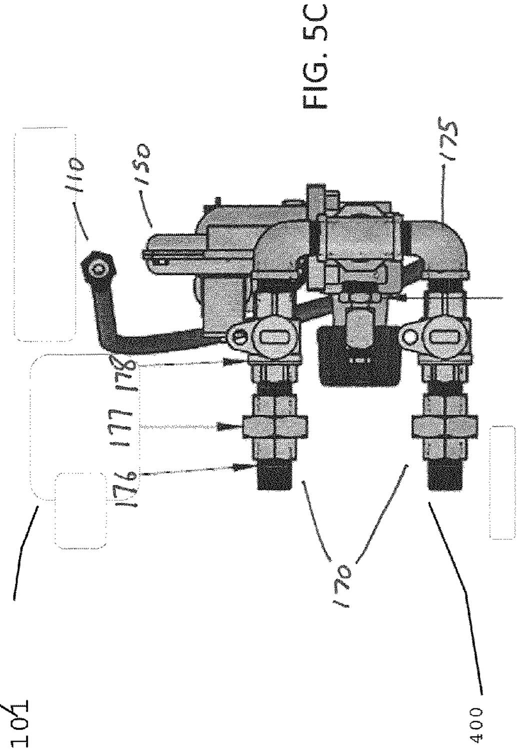
FIG. 5C is a side perspective view of a regulation apparatus according to one embodiment of the invention.

As described earlier, in some embodiments, a regulation apparatus 100 can be fitted within a caged regulation assembly 20. As illustrated in FIGS. 5A-5C, in some embodiments, the regulation apparatus 100 can include a system for delivery of natural gas. For example, the regulation apparatus 100 can include a series of fittings, safety devices and other items capable of coupling with a natural gas meter via an extension. In some embodiments, the apparatus 100 can include a plurality of components to facilitate safe and controlled transfer of natural gas from a source, such as a compressed natural gas cylinder 40, to a natural gas customer 15 via the downstream valves 170.

In some embodiments, the components can include at least a series of pressure regulators, pressure gauges, gas manifolds, valves, gas pipes and pipe connectors, and dust caps, and associated coupling and sealing apparatus. In some other embodiments, the components can include switches, gas sensors, gas alarms and other safety related devices. For example, FIG. 5A is a perspective view of a regulation apparatus 100 comprising the upstream supply end 101 and the downstream delivery end 102 according to one embodiment of the invention. Further, FIG. 5B is a front perspective view of a regulation apparatus 100 comprising the upstream supply end 101 and the downstream delivery end 102 according to one embodiment of the invention, and FIG. 5C is a side perspective view of a regulation apparatus 100 comprising the upstream supply end 101 and the downstream delivery end 102 according to one embodiment of the invention. As illustrated, in some embodiments, the high pressure hose 110 can be coupled to a primary regulator 120 on the upstream supply end 101 side of the apparatus 100. The high pressure hose 110 can include a delivery end 113 coupled to the regulation apparatus 100, and a supply end 118 including a cylinder coupling 116 for coupling to a natural gas cylinder 40. In some embodiments, the primary regulator 120 can be an ESAB® Trimline® regulator. Both ESAB® and Trimline® are registered trademarks of ESAB Global and ESAB—North America, entities owned by Colfax Corporation.

In some embodiments, the primary regulator 120 can be further coupled to a relief valve 140 via a pipe tee 145 coupling the downstream delivery end 102 side of the primary regulator 120 with the upstream supply end 101 side of the pipe tee 145. For example, in some embodiments, the pipe tee 145 can be coupled to the primary regulator 120 at the downstream delivery end 102 side of the primary regulator 120 using a pipe nipple 145*a* coupled to a pipe bushing 145*b*. In some embodiments, the relief valve 140, and pipe tee 145, can be coupled to a first valve 190, via a tee 193. For example, in some embodiments, the upstream supply end 101 side of the pipe nipple 145*c* can be coupled to the downstream delivery end 102 side of the pipe tee 145, and the downstream delivery end 102 side of the pipe nipple 145*c* can be coupled to the upstream supply end 101 side of the tee 193. In some embodiments, the relief valve 140 can include a FISHER® H-202 relief valve. FISHER® is a registered trademark of Fisher Controls International, Inc. In some embodiments, the first valve 190 can comprise metric fitting sizes. In some other embodiments, the first valve 190 can comprise non-metric fitting sizes.

In some further embodiments, the first valve 190 and tee 193 can be coupled to a downstream regulator 150. In some embodiments, the downstream regulator 150, can be coupled to a pipe tee 158. For example, in some embodiments, downstream delivery end 102 side of the tee 193 can couple with the upstream supply end 101 side of the pipe nipple 158*a*, and the pipe nipple 158*a* can couple with the downstream regulator 150. Further, in some embodiments, the pipe tee 158 can be further coupled to a pipe nipple 167 by coupling the downstream delivery end 102 side of the pipe nipple 158*a* with the upstream supply end 101 side of the pipe nipple 167.

In some embodiments, the pipe nipple 167 can couple to a pipe tee 165 that is further coupled to a water column gauge 160. For example, in some embodiments, the downstream delivery end 102 side of the pipe nipple 167 can couple with the upstream supply end 101 side of the pipe tee 165. Further, in some embodiments, the pipe tee 165 can be coupled to a pipe nipple 168. For example, in some embodiments, downstream delivery end 102 side of the pipe tee 165 can be coupled with the upstream supply end 101 side of the pipe nipple 168.

In some further embodiments, the nipple 168 can be coupled to at least one delivery valve 400. For example, in some embodiments, the delivery valve 400 can comprise at least one downstream valve 170. For example, in some embodiments, the downstream delivery end 102 side of the pipe nipple 168 can coupled to at least one street elbow 175 via a pipe tee 169. Further, the at least elbow 175 can be coupled to at least one downstream valve 170. In some embodiments, all pipe fittings downstream of the primary regulator 120 (i.e., the upstream supply end 101 side of the regulation apparatus 100) to the inlet of the downstream regulator 150 (the upstream supply end 101 side) are schedule 80 pipe fittings. In some embodiments, all pipe fittings downstream of pipe 158 are schedule 40 fittings.

As shown in FIGS. 5A and 5B, some embodiments can include one or more components designed to monitor natural gas pressure, and one or more components that can actuate based on a natural gas pressure. In some embodiments, valves can be included to provide relief of natural gas pressure. For example, in some embodiments, the regulator 120 can include regulator gauges 125*a*, 125*b*. In some other embodiments, the downstream regulator 150 can include a regulator vent 155. Other embodiments include a regulator 150 that includes a conventional burst disc design to protect the downstream components in the event of failure of the primary regulator 120.

Referring to FIG. 5C, in some embodiments, the downstream valves 170 can comprise several components for regulation and flow of natural gas. For example, as illustrated, in some embodiments the valves 170 can include a pipe nipple 176 for coupling to a service line 17. Moreover, the downstream valves 170 can include valves 178 coupled via a union 177. In some embodiments, the valves 178 can include Safe Ball® Lockwing Gas Service Ball Valve manufactured by Jomar® Valve. Safe Ball® and Jomar® are registered trademarks of the Jomar Group.

In some further embodiments, one or more components of the regulation apparatus 100 can be configured by a semi-permanent screw thread. For example, one or more of the components 120, 140 190, 150, 160 and 170 can be coupled using threaded fittings at their connection ends. In some further embodiments, one or more components of the regulation apparatus 100 can include a combination of welded or machined fittings. For example, some embodiments can include one or more components welded together. In other embodiments, one or more components can be machined into a single component (for example to form a machined manifold). In some embodiments, the use of welded and/or machined components can reduce the number of coupling junctions and reduce the size of the regulation apparatus 100.

In some embodiments, the portable tanking system 10 as described and illustrated in FIGS. 1A-1C, 2A-2B, 3A-3B, 4A-4C, and 5A-5C can include a regulation apparatus 100 that includes downstream valves 170. In some embodiments, one or more of the downstream valves 170 can be fluidly coupled with a natural gas service line 17. In some embodiments, one or more of the downstream valves 170 can be fluidly coupled with more than one natural gas service line 17. For example, in some embodiments, the portable tanking system 10 can provide substantially uninterrupted service to two natural gas customers 15 when a natural gas service line 17 undergoes replacement or maintenance.

In some alternative embodiments of the invention, the portable tanking system 10 can include an auxiliary compressed natural gas cylinder 40. In some embodiments, the cart 30 can be configured with dual bays to accommodate an auxiliary cylinder (not shown). In some other embodiments, one or more monitoring sensors or gauges can be including within the regulation apparatus 100 to enable a user to monitor a pressure of a primary natural gas supply (e.g provided by a compressed natural gas cylinder 40, to enable switching to an auxiliary natural gas supply when the primary supply is depleted). Some embodiments can include visual or audible alarms to warn a user of an approaching depletion of either a primary or auxiliary natural gas supply.

In some embodiments, wheels 34 can include a weight capacity of 250 lbs or more in order to accommodate a higher weight capacity when using an auxiliary cylinder 40. In some embodiments, the wheels 34 can be solid or non-pneumatic wheels. In some embodiments, the compressed natural gas cylinder 40 can comprise iron or steel. In some further embodiments, the cylinder 40 can comprise aluminum. In other embodiments, the cylinder 40 can comprise a composite material. For example, in some embodiments, the cylinder 40 can comprise a carbon fiber composite or a glass fiber composite material.

Some embodiments include a cart 30 with a conventional tool storage system (not shown). For example, in some embodiments, a conventional toolbox can be integrated with, or otherwise coupled to the cart 30 to serve as storage for tools, probes, grounding rods, bags, and other materials and components known in the art. In some embodiments, a conventional toolbox can be used to store at least one hose used in the hot tanking process. In some other embodiments, hoses can be at least partially accommodated within other portions of the cart 30.

In some other embodiments, the portable tanking system 10 can include more than one set of downstream valves 170. For example, the portable tanking system 10 can include more than one regulation apparatus 100 each including one set of downstream valves 170, and/or as described earlier the system 10 the portable tanking system 10 can include more than one caged regulation assembly 20.

Some embodiments of the invention provide a portable tanking system 10 capable of providing a substantially uninterrupted service to more than one natural gas customer 15 at substantially the same time. In this instance, the portable tanking system 10 is especially applicable to performing work on apartment buildings and the like. For example, in some embodiments the portable tanking system 10 can feed more than one customer 15 of the apartment 16*a* (shown in FIG. 6) by feeding meters 601*c* substantially simultaneously.

Figure 5D:
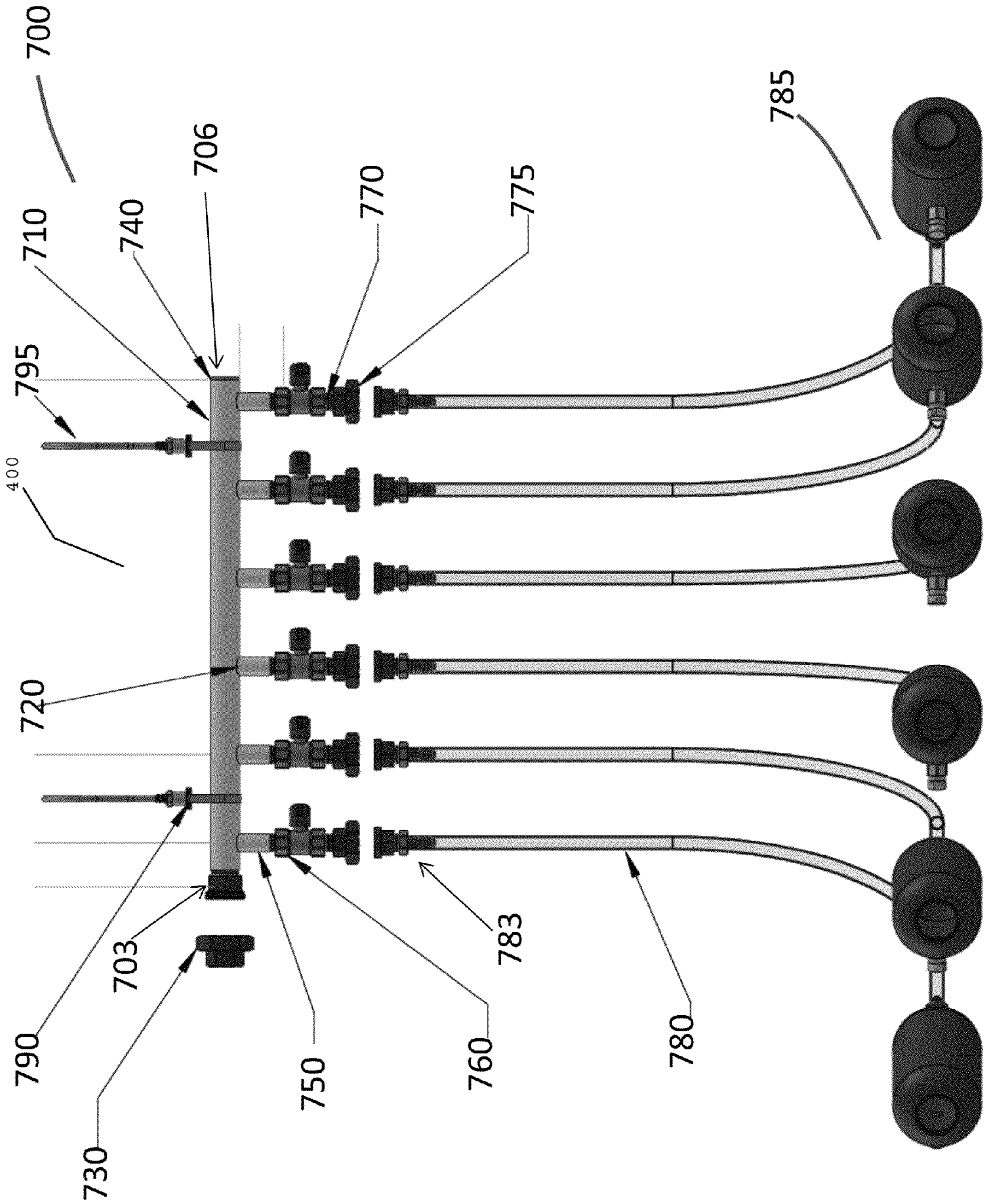
FIG. 5D illustrates a distribution manifold assembly according to one embodiment of the invention.

In some embodiments, the portable tanking system 10 can include a distribution manifold assembly 700. For example, FIG. 5D illustrates a distribution manifold assembly 700 according to one embodiment of the invention. As shown, the distribution manifold assembly 700 can comprise a manifold (steel pipe) 710 including a first end 703 and a second end 706. The second end 706 can be closed using a cap 740, and the union 730, coupled to the first end 703 that can be used to couple to a natural gas supply. For example, in some embodiments, the first end 703 can be coupled to at least one of the downstream valves 170. In some other embodiments, the distribution manifold assembly 700 can replace the downstream valves 170 by coupling directly to the downstream pipe nipple 168 of the regulation apparatus 100. For example, in some embodiments, the downstream delivery end 102 side of the pipe tee 165 can be coupled with the upstream supply end 101 side of the pipe nipple 168, and the downstream delivery end 102 side of the pipe nipple 168 can coupled with the first end 703 to provide a supply of natural gas to the manifold 710.

In some embodiments, the manifold 710 can include at least one port 720 for distribution of natural gas to one or more outlets. For example, in some embodiments, a steel pipe 750 can be coupled to one or more of the ports 720, and can extend from each port 720 to couple to at least one hose assembly 780. Each steel pipe 750 can be coupled to a ball valve 760, and each ball valve 60 can include a steel pipe (close nipple) 770, and a union 775. In some embodiments, at least one hose assembly 780 can be coupled to a ball valve 760 by coupling connectors 783 to a union 775. Further, each hose assembly 780 can include at least one distribution coupler 785 that can be used to couple to a customer's gas supply inlet (e.g., such as gas meters 601*a*-601*d*). Some embodiments include a plurality of distribution couplers 385, where each coupler 785 can be coupled to a gas supply inlet. Some embodiments of the distribution manifold assembly 700 can be secured to a wall or structure using at least one pipe hanger 790 coupled to a threaded hook 795.

FIG. 6 is a service line 17 configuration according to one embodiment of the invention. In some embodiments, a portable tanking system 10 can be coupled with a customer 15 service line 17 of an apartment 16*a*, a duplex apartment 16*b*, or a single structure 16*c*. In some embodiments, the portable tanking system 10 can be coupled to an apartment 16*a*, a duplex apartment 16*b*, or a single structure 16*c* via an alternate service line 17. For example, as depicted in FIG. 6, in some embodiments, buildings or structures can be served by customer 15 service line 17 coupled gas meters 601*a*, 601*b*, 601*c*, 601*d*. In some embodiments, buildings or structures can be served by customer 15 service line 17 coupled gas meters 601*a*, 601*b*, 601*c*, 601*d* while also being served by alternate service line 17 coupled gas meters 602*a*, 602*b*, 602*c*, 602*d*.

Some embodiments include methods of providing a substantially uninterrupted supply of natural gas to a building or structure using the portable tanking system 10 as described and illustrated in FIGS. 1A-1C, 2A-2B, 3A-3B, 4A-4C, and 5A-5C. For example, in some embodiments, one or more downstream valves 170 or distribution manifold assemblies 700 can be coupled with a natural gas supply of a building or structure. For example, in some embodiments, a method of providing a substantially uninterrupted supply of natural gas to a building or structure can include fluidly coupling one or more downstream valves 170 or distribution manifold assemblies 700 to one or more customer 15 service lines 17 including coupled gas meters 601*a*, 601*b*, 601*c*, 601*d*. In some other embodiments, a method of providing a substantially uninterrupted supply of natural gas to a building or structure can include fluidly coupling one or more downstream valves 170 or distribution manifold assemblies 700 to one or more alternate service line 17 coupled gas meters 602*a*, 602*b*, 602*c*, 602*d*. In some other embodiments, one or more downstream valves 170 or distribution manifold assemblies 700 can be fluidly coupled to one or more customer 15 service line 17 coupled gas meters 601*a*, 601*b*, 601*c*, 601*d* to deliver natural gas downstream of the meters 601*a*, 601*b*, 601*c*, 601*d*, and one or more downstream valves 170 or distribution manifold assemblies 700 can be coupled to one or more alternate service line 17 coupled gas meters 602*a*, 602*b*, 602*c*, 602*d* to deliver natural gas downstream of the meters 602*a*, 602*b*, 602*c*, 602*d*.

In some embodiments, a method of providing a substantially uninterrupted supply of natural gas to a building or structure using the portable tanking system 10 as described and illustrated in FIGS. 1A-1C, 2A-2B, 3A-3B, 4A-4C, and 5A-5C can include 1). assembling a portable tanking system 10, 2). transporting the tanking assembly 10 to a service location, 3). electrically coupling and grounding the tanking assembly 10 to a customer 15 natural gas service line, 4). fluidly coupling at least one delivery valve 400 comprising either a downstream valve 170 or a distribution manifold assembly 700 to the customer 15 natural gas service line, 5). coupling the high pressure hose 110 to the compressed natural gas cylinder 40, and 6). controlling a downstream flow of natural gas from the compressed natural gas cylinder 40 to the customer 15 natural gas service line 17 using the regulation apparatus 100. In some embodiments, the downstream flow of natural gas can be controlled and monitored using at least one of the high pressure hose 110 coupled to the primary regulator 120, the relief valve 140, the first valve 190, the downstream regulator 150, and the water column gauge 160. In some embodiments, the water column gauge 160 can be a Marsh/Bellowfram 0-15 IWC (inches of water column) gauge. Marsh/Bellowfram® is a registered trademark of the Marsh/Bellowfram group of companies. As shown in FIGS. 5A and 5B, some embodiments of the method can include one or more components designed to regulate the pressure of natural gas pressure. In some embodiments, the regulator 120 can include regulator gauges 125*a*, 125*b*, and downstream regulator 150 can include a regulator vent 155.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A method of providing substantially uninterrupted gas service during a temporary, primary gas service shutdown, comprising:

coupling at least one gas cylinder to a portable tanking assembly, the tanking assembly comprising:

a cart including a rear frame and a carrier frame coupled to and extending from the rear frame and supported on an axle with wheels, a caged regulation assembly coupled to the cart, the caged regulation assembly comprising a protective cage housing at least a portion of a regulation apparatus comprising an upstream supply end coupled to a downstream delivery end, the regulation apparatus including a primary regulator coupled to at least one relief valve, the at least one relief valve coupled to at least one downstream regulator, the at least one downstream regulator coupled to a water column gauge, the water column gauge coupled to at least one delivery valve; and electrically coupling and grounding the tanking assembly to a customer's gas service line;

fluidly coupling at least one downstream valve to a gas service line, coupling a high pressure hose to the gas cylinder, and controlling a downstream flow of gas from the gas cylinder to the gas service line using the regulation apparatus; and monitoring at least one of supply and flow of gas to ensure substantially uninterrupted gas service during the temporary shutdown of the primary gas service.

2. The method of claim 1, wherein the downstream flow of gas is controlled and monitored using at least one of the high pressure hose coupled to the primary regulator, the relief valve, the downstream regulator, and the water column gauge.

3. The method of claim 1, wherein the regulator can include regulator gauges, and downstream regulator can include a regulator vent.

4. The method of claim 1, wherein a first valve can be coupled between the relief valve and the downstream regulator.

5. The method of claim 1, wherein the at least one downstream valve comprises the at least one delivery valve fluidly coupled to the gas service line.

6. The method of claim 5, wherein the at least one delivery valve comprises a distribution manifold assembly including a manifold and at least one distribution coupler coupled to the manifold.

7. The method of claim 6, wherein the distribution manifold assembly comprises a plurality of couplers coupled to a plurality of gas service lines.

8. The method of claim 1, wherein the rear frame comprises a first vertical support and a second vertical support and the carrier frame comprises a first side and a second side; and wherein the rear frame is positioned substantially centered on the axle so that the first vertical support and the second vertical support are substantially equidistant from the axial center of the axle; and wherein the carrier frame is positioned on the axle substantially off-center so that the first side is positioned substantially further from the axial center of the axle than the second side.

9. A portable gas delivery system comprising:

a cart including a rear frame comprising a first vertical support and a second vertical support and a carrier frame extending from the rear frame and supported on an axle with wheels, the carrier frame including a first side comprising a plurality of first braces and a second side comprising a plurality second braces, the carrier frame coupled to and extending from the rear frame; and a caged regulation assembly coupled to the cart, the caged regulation assembly comprising a protective cage housing at least a portion of a regulation apparatus comprising an upstream supply end coupled to a downstream delivery end;

the regulation apparatus including a primary regulator coupled to at least one relief valve, the at least one relief valve coupled to at least one downstream regulator, and the at least one downstream regulator coupled to a water column gauge, and the water column gauge coupled to at least one delivery valve.

10. The portable gas delivery system of claim 9, wherein the rear frame is positioned substantially centered on the axle so that the first vertical support and the second vertical support are substantially equidistant from the axial center of the axle; and wherein the first side comprises the first braces coupled to and extending substantially perpendicular from the first vertical support to couple with a first front support; and wherein the second side comprises the second braces coupled to and extending substantially perpendicular from the rear frame to couple with a second front support.

11. The portable gas delivery system of claim 10, wherein the carrier frame is positioned on the axle substantially off-center so that the first side is positioned substantially further from the axial center of the axle than the second side.

12. The portable gas delivery system of claim 11, wherein the caged regulation assembly is coupled to the second side.

13. The portable gas delivery system of claim 12, wherein a majority of the caged regulation assembly is positioned over the axle.

14. The portable gas delivery system of claim 10, wherein the cart further includes a flat base; and wherein the first front support and the second front support are coupled to the flat base on substantially opposite sides.

15. The portable gas delivery system of claim 14, where the first side further comprises a first thigh section coupled to the first front support and a second thigh section coupled to the second front support; and wherein the first thigh section extends and couples with a first calf section and the second thigh section extends and couples with a second calf section; and wherein the first calf section and the second calf section are positioned are opposite corners of the flat base each extending substantially vertically from the flat base.

16. The gas delivery system of claim 9, wherein the caged regulation assembly further includes a coupled grounding strap coupled to a grounding rod removably stored on the cart.

17. The gas delivery system of claim 9, wherein the regulation apparatus further includes a high pressure hose coupled to the upstream supply side of the primary regulator.

18. The gas delivery system of claim 9, wherein the protective cage comprises at least one hinged door coupled to a main cage.

19. The portable gas delivery system of claim 9, wherein the at least one relief valve is coupled to primary regulator on the downstream delivery end side of the primary regulator, and the at least one relief valve is coupled to the at least one downstream regulator on the upstream supply end side of the at least at least one downstream regulator, and the water column gauge is coupled to the downstream regulator on the downstream delivery end side of the downstream regulator.

20. The portable gas delivery system of claim 19, wherein the regulation apparatus further comprises a downstream delivery end that includes at least one delivery valve coupled adjacent to the downstream delivery end side of the water column gauge.

21. The gas delivery system of claim 20, wherein the delivery valve comprises a distribution manifold assembly including a manifold and a plurality of distribution couplers coupled to the manifold, the plurality of distribution couplers configured and arranged to delivery natural gas to a plurality of customers.

22. The gas delivery system of claim 9, wherein the cart includes at least one deployable stabilizer foot.

23. The gas delivery system of claim 22, wherein the stabilizer foot can be deployed to a deployed position or retracted to a retracted position.

24. The gas delivery system of claim 9, wherein the cart further includes a toggle clamp coupled to a toggle mechanism, the toggle mechanism configured and arranged to be actuate the toggle clamp to hold and secure the caged regulation assembly.

25. The gas delivery system of claim 24, wherein the toggle mechanism configured and arranged to actuate the toggle clamp to release the caged regulation assembly from the second side of the carrier frame.

26. The gas delivery system of claim 25, wherein the protective cage comprises a mesh portion, the mesh portion configured and arranged to enable air to flow through the protective cage.

* * * * *